US012466912B2

United States Patent
Miyagi et al.

(10) Patent No.: US 12,466,912 B2
(45) Date of Patent: Nov. 11, 2025

(54) BLOCKED POLYISOCYANATE COMPOSITION, HEAT-CURABLE RESIN COMPOSITION, CURED PRODUCT, AND PRODUCTION METHOD THEREFOR

(71) Applicant: KOEI CHEMICAL COMPANY, LIMITED, Sodegaura (JP)

(72) Inventors: Motoyoshi Miyagi, Sodegaura (JP); Mitsuki Onoda, Sodegaura (JP)

(73) Assignee: KOEI CHEMICAL COMPANY, LIMITED, Sodegaura (JP)

( * ) Notice: Subject to any disclaimer, the term of this patent is extended or adjusted under 35 U.S.C. 154(b) by 344 days.

(21) Appl. No.: 17/921,161

(22) PCT Filed: Apr. 28, 2021

(86) PCT No.: PCT/JP2021/016919
§ 371 (c)(1),
(2) Date: Oct. 25, 2022

(87) PCT Pub. No.: WO2021/221090
PCT Pub. Date: Nov. 4, 2021

(65) Prior Publication Data
US 2023/0203235 A1    Jun. 29, 2023

(30) Foreign Application Priority Data

Apr. 30, 2020    (JP) .................. 2020-079968

(51) Int. Cl.
| C08G 18/80 | (2006.01) |
| C07D 233/64 | (2006.01) |
| C07D 233/90 | (2006.01) |
| C08G 18/20 | (2006.01) |
| C08G 18/42 | (2006.01) |
| C08G 18/71 | (2006.01) |
| C08G 18/76 | (2006.01) |
| C08G 18/78 | (2006.01) |
| C08L 75/06 | (2006.01) |

(52) U.S. Cl.
CPC ....... *C08G 18/8077* (2013.01); *C07D 233/64* (2013.01); *C08G 18/2027* (2013.01); *C08G 18/2081* (2013.01); *C08G 18/42* (2013.01); *C08G 18/4238* (2013.01); *C08G 18/71* (2013.01); *C08G 18/7664* (2013.01); *C08G 18/7831* (2013.01); *C08G 18/807* (2013.01); *C08L 75/06* (2013.01); *C07D 233/90* (2013.01); *C08G 2190/00* (2013.01)

(58) Field of Classification Search
CPC ............ C08G 18/8077; C08G 18/2027; C08G 18/42; C08G 2190/00; C08G 18/2081; C08G 18/71; C08G 18/7664; C08G 18/4238; C08G 18/7831; C08G 18/807; C07D 233/90; C07D 233/64; C08L 75/06
See application file for complete search history.

(56) References Cited

U.S. PATENT DOCUMENTS

| 4,345,057 A | 8/1982 | Yamabe et al. |
| 2019/0177464 A1 | 6/2019 | Miyagi et al. |
| 2020/0024237 A1 | 1/2020 | Tsuboi et al. |
| 2020/0216600 A1 | 7/2020 | Miyagi et al. |
| 2020/0248009 A1 | 8/2020 | Matsunaga et al. |
| 2022/0048864 A1 | 2/2022 | Miyagi et al. |

FOREIGN PATENT DOCUMENTS

| DE | 10 2008 061 329 | 6/2010 |
| JP | 57-34107 | 2/1982 |
| JP | 6-275311 | 12/1986 |
| WO | 2018/025970 | 2/2018 |
| WO | 2018/181753 | 10/2018 |
| WO | 2019/065953 | 4/2019 |
| WO | 2019/066029 | 4/2019 |
| WO | 2020/067431 | 4/2020 |

OTHER PUBLICATIONS

Extended European Search Report issued Apr. 4, 2024 in corresponding European Patent Application No. 21795888.3.
International Search Report issued Jun. 15, 2021 in International (PCT) Application No. PCT/JP2021/016919.
Olivier et al., "N-Heterocyclic carbene-catalysed synthesis of polyurethanes", Polymer Chemistry, 2012, vol. 3, pp. 605-608.
Temprado et al., "Synthesis, structure, and thermochemistry of adduct formation between N-heterocyclic carbenes and isocyanates or mesitylnitrile oxide", Struct Chem, 2013, vol. 24, pp. 2059-2068.

*Primary Examiner* — Rabon A Sergent
(74) *Attorney, Agent, or Firm* — Wenderoth, Lind & Ponack, L.L.P.

(57) ABSTRACT

The present invention provides a blocked polyisocyanate composition comprising a blocked polyisocyanate compound and an amidate compound represented by the following Formula (2):

(2)

wherein B, $R^4$, $R^5$, $R^6$, $R^7$, $R^8$, $R^9$, $R^{10}$, and $R^{11}$ are as defined in the specification.

12 Claims, No Drawings

BLOCKED POLYISOCYANATE COMPOSITION, HEAT-CURABLE RESIN COMPOSITION, CURED PRODUCT, AND PRODUCTION METHOD THEREFOR

TECHNICAL FIELD

The present invention relates to a blocked polyisocyanate composition, a thermosetting resin composition, and a cured product and a production method therefor.

BACKGROUND ART

Blocked polyisocyanate compositions are compositions comprising a blocked polyisocyanate compound and a blocking agent dissociation catalyst. Blocked polyisocyanate compounds are compounds obtained by reaction of a polyisocyanate compound with a blocking agent containing active hydrogen groups that are capable of reacting with isocyanate groups. Blocked polyisocyanate compounds are inactive at ordinary temperatures with the isocyanate group of the polyisocyanate being blocked by a blocking agent; however, heating causes dissociation of the blocking agent to regenerate the isocyanate group. Blocked polyisocyanate compositions having such properties have been widely used for applications such as paints and adhesives, and as a raw material or a crosslinking agent for the production of one-component thermosetting polyurethane resin.

In recent years, curing at lower temperatures is required to reduce energy costs and to process resin materials with lower heat resistance.

A catalyst is sometimes added to lower the curing temperature. Commonly known compounds for use as a catalyst include tin compounds, such as dibutyltin dilaurate (hereinafter referred to as "DBTDL").

A thermosetting resin composition comprising the blocked polyisocyanate compound mentioned above formed by using a blocking agent and a tin compound typically requires a curing temperature of 120° C. or higher.

Known blocking agent dissociation catalysts include 1-methyl-3-n-octylimidazolium-2-N-phenylamidate represented by the following structural formula (Patent Literature (PTL) 1).

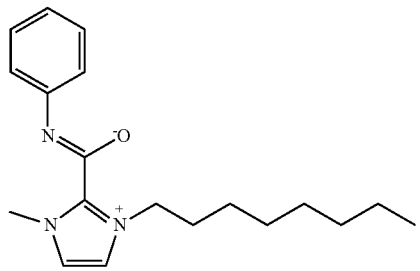

CITATION LIST

Patent Literature

PTL 1: WO2019/065953A1

SUMMARY OF INVENTION

Technical Problem

By using the 1-methyl-3-n-octylimidazolium-2-N-phenylamidate disclosed in PTL 1 as a blocking agent dissociation catalyst, the present inventors evaluated the curing properties of a thermosetting resin composition comprising a blocked polyisocyanate blocked with methyl ethyl ketoxime and a polyol. The results revealed that curing within 30 minutes required a temperature exceeding 100° C. (Comparative Example 2 described below), and that the low-temperature curing properties were unsatisfactory.

Accordingly, an object is to provide a blocked polyisocyanate composition having excellent low-temperature curing properties, as well as a thermosetting resin composition comprising the blocked polyisocyanate composition, and a cured product thereof.

Solution to Problem

The present invention provides the following blocked polyisocyanate composition, thermosetting resin composition, and cured product.

[1] A blocked polyisocyanate composition comprising a blocked polyisocyanate compound and an amidate compound represented by the following Formula (2):

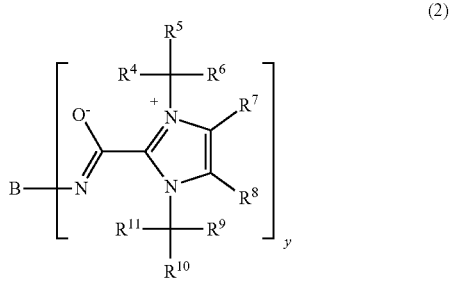

wherein B represents a substituted or unsubstituted hydrocarbon group; $R^4$, $R^5$, $R^6$, $R^9$, $R^{10}$, and $R^{11}$ are the same or different, and each represents a $C_1$-$C_{20}$ hydrocarbon group that may be substituted with a heteroatom; $R^7$ and $R^8$ are the same or different, and each represents a hydrogen atom or a $C_1$-$C_{20}$ hydrocarbon group that may be substituted with a heteroatom; $R^4$ and $R^5$, $R^5$ and $R^6$, $R^7$ and $R^8$, $R^9$ and $R^{10}$, or $R^{10}$ and $R^{11}$ may form a ring structure together with the carbon atoms to which they are bonded; y is an integer of 1 or more and 20 or less; and the group represented by $CR^4R^5R^6$ or the group represented by $CR^9R^{10}R^{11}$ may be an adamantyl group.

[2] The blocked polyisocyanate composition according to [1], wherein B in Formula (2) is a substituted or unsubstituted aromatic hydrocarbon group.

[3] The blocked polyisocyanate composition according to [1] or [2], wherein $R^4$, $R^5$, $R^9$, and $R^{10}$ are the same or different, and each represents a $C_1$-$C_6$ hydrocarbon group that may be substituted with a heteroatom.

[4] The blocked polyisocyanate composition according to any one of [1] to [3], wherein $R^6$ and $R^{11}$ in Formula (2) are the same or different, and each represents a $C_1$-$C_{12}$ hydrocarbon group that may be substituted with a heteroatom.

[5] The blocked polyisocyanate composition according to any one of [1] to [4], wherein $R^7$ and $R^8$ in Formula (2) are hydrogen atoms.

[6] The blocked polyisocyanate composition according to [1], wherein the amidate compound represented by Formula (2) is any of five compounds represented by the following formulas:

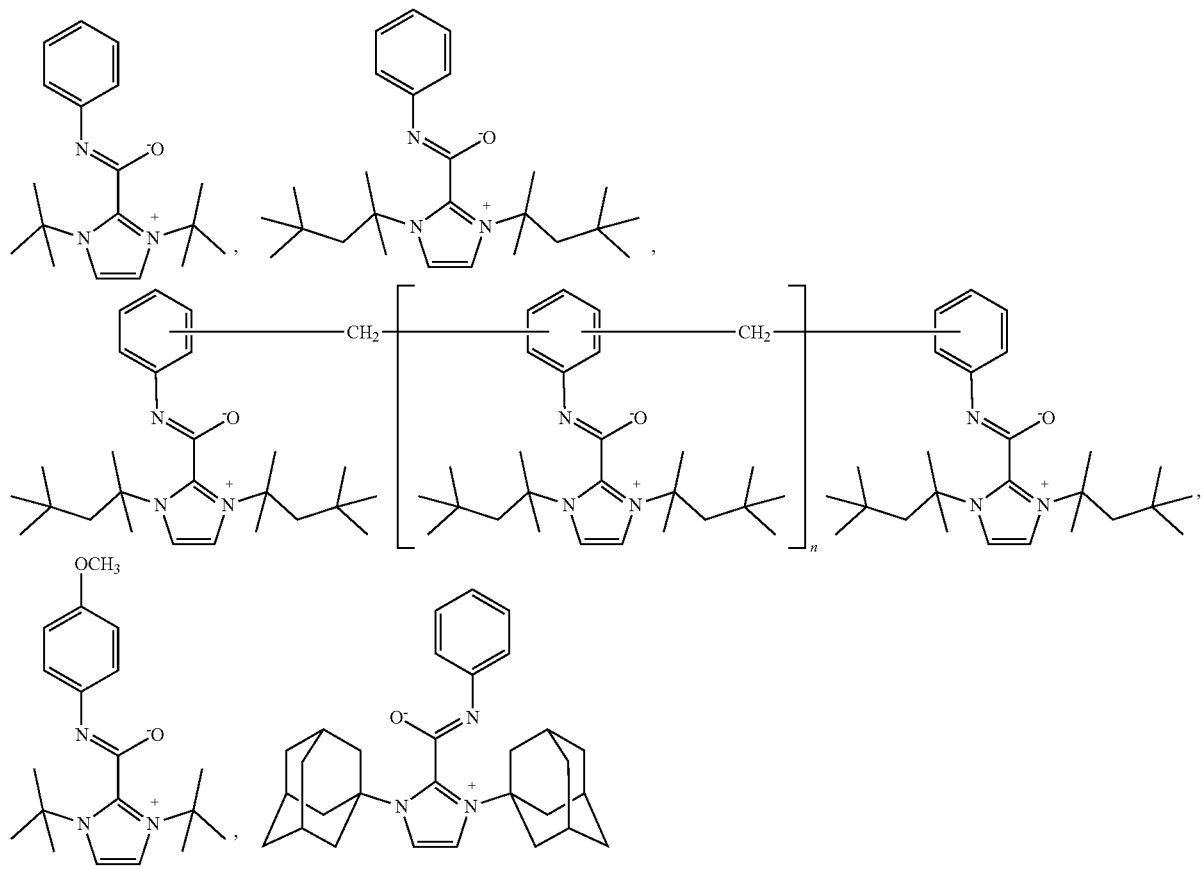

wherein n is 0 or an integer of 1 to 4.

[7] The blocked polyisocyanate composition according to any one of [1] to [6], wherein the blocked polyisocyanate compound is a reaction product of a blocking agent and a polyisocyanate, and the blocking agent is an oxime-based blocking agent.

[8] The blocked polyisocyanate composition according to any one of [1] to [6], wherein the blocked polyisocyanate compound is a reaction product of a blocking agent and a polyisocyanate, and the blocking agent is methyl ethyl ketone oxime.

[9] A thermosetting resin composition comprising the blocked polyisocyanate composition according to any one of [1] to [8] and a compound having an isocyanate-reactive group.

[10] The thermosetting resin composition according to [9], wherein the compound having an isocyanate-reactive group is a polyol compound.

[11] A cured product obtained by curing the thermosetting resin composition according to [9] or [10].

[12] A method for producing a cured product, comprising curing the thermosetting resin composition according to [9] or [10] by heating.

Advantageous Effects of Invention

The present invention can provide a blocked polyisocyanate composition having excellent low-temperature curing properties, a thermosetting resin composition comprising the blocked polyisocyanate composition, a cured product of the thermosetting resin composition, and a method for producing the cured product.

DESCRIPTION OF EMBODIMENTS

Blocked Polyisocyanate Composition Comprising Blocked Polyisocyanate Compound and Amidate Compound Represented by Formula (2)

The blocked polyisocyanate composition of the present invention comprises a blocked polyisocyanate compound and an amidate compound represented by Formula (2).

The blocked polyisocyanate compound is explained.

Examples of the blocked polyisocyanate compound include compounds obtained by reacting polyisocyanates and blocking agents to block the isocyanate groups in the polyisocyanates with the blocking agents. The blocked polyisocyanate compounds may be used singly or as a mixture of two or more.

The polyisocyanate that constitutes the blocked polyisocyanate compound is not particularly limited, as long as it is a compound having two or more isocyanate groups. Examples of polyisocyanates include the following:
(i) aliphatic polyisocyanates,
(ii) alicyclic polyisocyanates,
(iii) aromatic polyisocyanates,
(iv) aromatic aliphatic polyisocyanates, and
(v) modified isocyanates formed from at least one member selected from the group consisting of aliphatic polyisocyanates, alicyclic polyisocyanates, aromatic polyisocyanates, and aromatic aliphatic polyisocyanates.

Preferred among these are the aliphatic polyisocyanates (i), alicyclic polyisocyanates (ii), and modified isocyanates (v) formed from at least one member selected from the group consisting of aliphatic polyisocyanates, alicyclic polyisocyanates, aromatic polyisocyanates, and aromatic aliphatic polyisocyanates.

These polyisocyanates may be used singly or as a mixture of two or more.

Examples of aliphatic polyisocyanates include 1,4-tetramethylene diisocyanate, 1,6-hexamethylene diisocyanate, 2,2,4-trimethylhexamethylene diisocyanate, 2,4,4-trimethylhexamethylene diisocyanate, lysine diisocyanate, dimer acid diisocyanate, and the like.

Examples of alicyclic polyisocyanates include 1,3-bis(isocyanatomethyl)cyclohexane, 1,4-bis(isocyanatomethyl)cyclohexane, 3-isocyanatomethyl-3,3,5-trimethylcyclohexane (isophorone diisocyanate (IPDI)), bis-(4-isocyanatocyclohexyl)methane, norbornane diisocyanate, and the like.

Examples of aromatic polyisocyanates include 2,4'-diphenylmethane diisocyanate, 4,4'-diphenylmethane diisocyanate, crude diphenylmethane diisocyanate, 1,4-phenylene diisocyanate, 2,4-tolylene diisocyanate, 2,6-tolylene diisocyanate, 3,3'-dimethyl-4,4'-diisocyanatobiphenyl, 3,3'-dimethyl-4,4'-diisocyanatodiphenylmethane, 1,5-naphthylene diisocyanate, and the like.

Examples of aromatic aliphatic polyisocyanates include 1,3-xylylene diisocyanate, 1,4-xylylene diisocyanate, α,α,α',α'-tetramethylxylylene diisocyanate, and the like.

Examples of modified isocyanates include isocyanate-terminated compounds obtained by the reaction of the above polyisocyanate compounds with compounds having an active hydrogen group, and reaction products of the polyisocyanate compounds and/or the isocyanate-terminated compounds (e.g., adduct-type polyisocyanates, and modified isocyanates obtained by allophanatization reaction, carbodiimidization reaction, uretodionization reaction, isocyanuration reaction, uretoniminization reaction, biuretization reaction, or the like); and preferably adduct-type polyisocyanates, polyisocyanates modified by isocyanuration reaction, and polyisocyanates modified by biuretization reaction (polyisocyanates having a biuret bond).

A polyisocyanate having a biuret bond is obtained by reacting a so-called biuretizing agent, such as water, tert-butanol, or urea, with a polyisocyanate at a molar ratio of the biuretizing agent/isocyanate groups in the polyisocyanate of about 1/2 to about 1/100, followed by purification by removing the unreacted polyisocyanate. A polyisocyanate having an isocyanurate bond is obtained, for example, by performing the cyclic trimerization reaction using a catalyst etc., stopping the reaction when the conversion rate reaches about 5 to about 80 mass %, and removing the unreacted polyisocyanate for purification. In this case, a mono- to hexavalent alcohol compound can be used in combination.

Examples of polyisocyanates having a biuret bond include a biuret modified product of 1,6-hexamethylene diisocyanate (HDI), a biuret modified product of isophorone diisocyanate (IPDI), and a biuret modified product of toluene diisocyanate (TDI) shown below. Commercial products include Desmodur N75, Desmodur N100, and Desmodur N3200 (all produced by Sumika Covestro Urethane Co., Ltd.); Duranate 24A-100, Duranate 22A-75P, and Duranate 21S-75E (all produced by Asahi Kasei Corporation); and the like.

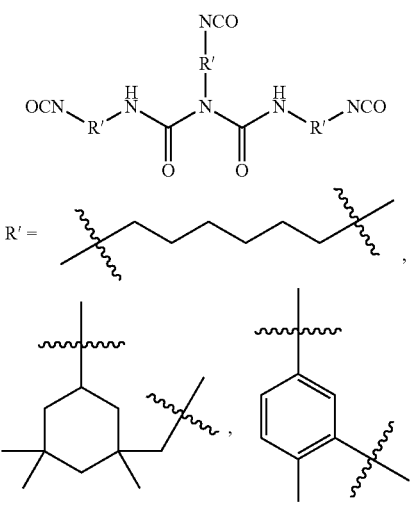

A polyisocyanate having an isocyanurate bond is obtained, for example, by performing the cyclic trimerization reaction using a catalyst etc., stopping the reaction when the conversion rate reaches about 5 to about 80 mass %, and removing the unreacted polyisocyanate for purification. In this case, a mono- to hexavalent alcohol compound can be used in combination.

The catalyst for the above isocyanuration reaction is generally preferably a basic catalyst. Examples of the catalyst include the following:

(1) hydroxides of tetraalkylammonium, such as tetramethylammonium, tetraethylammonium, and trimethylbenzylammonium; and organic weak acid salts, such as acetic acid and capric acid;
(2) hydroxides of hydroxyalkylammonium, such as trimethylhydroxypropylammonium, trimethylhydroxyethylammonium, triethylhydroxypropylammonium, and triethylhydroxyethylammonium; and organic weak acid salts, such as acetic acid and capric acid;
(3) metal salts of alkyl carboxylic acids with, for example, tin, zinc, and lead;
(4) metal alcoholates of sodium, potassium, etc.;
(5) aminosilyl group-containing compounds, such as hexamethyldisilazane;
(6) Mannich bases;
(7) combination of tertiary amines and epoxy compounds;
(8) phosphorus-based compounds, such as tributylphosphine.

These can be used in combination of two or more.

If the catalyst may adversely affect paints or coating film properties, the catalyst may be neutralized with an acidic compound. Examples of acidic compounds include inorganic acids, such as hydrochloric acid, phosphorous acid, and phosphoric acid; sulfonic acids or derivatives thereof, such as methanesulfonic acid, p-toluenesulfonic acid, p-toluenesulfonic acid methyl ester, and p-toluenesulfonic acid ethyl ester; ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethyl glycol acid phosphate, butyl pyrophosphate, butyl phosphite, and the like. These may be used in combination of two or more.

Examples of polyisocyanates having an isocyanurate bond include isocyanurate-modified HDI, isocyanurate-modified IPDI, and isocyanurate-modified TDI shown below. Commercial products include Sumidur N3300, Desmodur 3900, Desmodur Z4470BA, Desmodur XP2763, Desmodur IL1351BA, and Desmodur HLBA (all produced by Sumika Covestro Urethane Co., Ltd.); Duranate TPA-100, Duranate MFA-75B, Duranate TUL-100, and Duranate TSA-100 (all produced by Asahi Kasei Corporation); and the like.

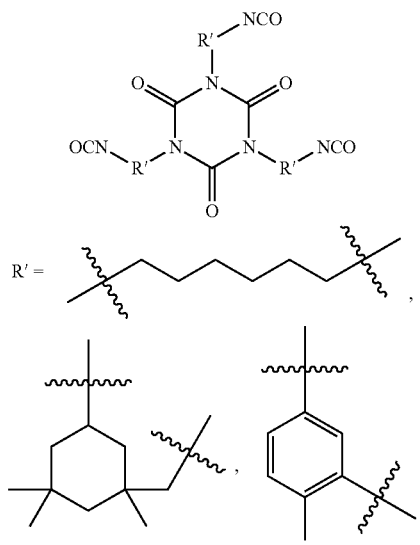

A polyisocyanate having a urethane bond is obtained, for example, by reacting a di- to hexavalent alcohol-based compound, such as trimethylolpropane (hereinafter referred to as TMP), with a polyisocyanate at a molar ratio of hydroxyl groups in the alcohol-based compound/isocyanate groups in the polyisocyanate of about 1/2 to about 1/100, and then removing the unreacted polyisocyanate for purification. Removal of the unreacted polyisocyanate for purification is not necessarily required.

Examples of polyisocyanates having a urethane bond include a reaction product of HDI and TMP, a reaction product of IPDI and TMP, and a reaction product of TDI and TMP shown below. Commercial products include Sumidur N3300, Desmodur 3900, Desmodur Z4470BA, Desmodur XP2763, Desmodur IL1351BA, and Desmodur HLBA (all produced by Sumika Covestro Urethane Co., Ltd.); Duranate TPA-100, Duranate MFA-75B, Duranate TUL-100, and Duranate TSA-100 (all produced by Asahi Kasei Corporation); and the like.

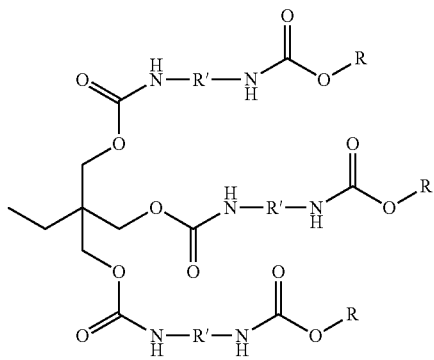

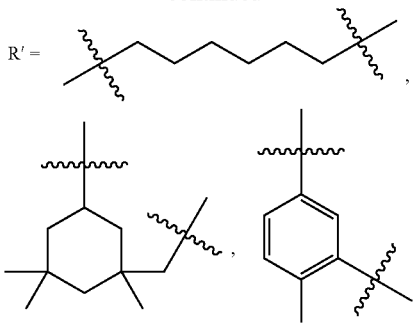

Examples of known blocking agents for isocyanates in which some isocyanate groups of the above polyisocyanates or modified isocyanates are blocked with known blocking agents include phenols, such as phenol, thiophenol, methylthiophenol, xylenol, cresol, resorcinol, nitrophenol, and chlorophenol; oximes, such as acetone oxime, methyl ethyl ketone oxime, and cyclohexanone oxime; alcohols, such as methanol, ethanol, n-propyl alcohol, isopropyl alcohol, n-butyl alcohol, isobutyl alcohol, t-butyl alcohol, t-pentanol, ethylene glycol monoethyl ether, ethylene glycol monobutyl ether, diethylene glycol monoethyl ether, propylene glycol monomethyl ether, and benzyl alcohol; pyrazoles, such as 3,5-dimethyl pyrazole and 1,2-pyrazole; triazoles, such as 1,2,4-triazole; halogen-substituted alcohols, such as ethylene chlorohydrin and 1,3-dichloro-2-propanol; lactams, such as ε-caprolactam, δ-valerolactam, γ-butyrolactam, and β-propyllactam; active methylene compounds, such as methyl acetoacetate, ethyl acetoacetate, acetylacetone, methyl malonate, and ethyl malonate; and the like. Other examples include amines, imides, mercaptans, imines, ureas, diaryls, and the like.

Examples of blocking agents include alcohol-based compounds, phenol-based compounds, amine-based compounds, lactam-based compounds, oxime-based compounds, active methylene-based compounds, pyrazole-based compounds, and triazole-based compounds; preferably lactam-based compounds, oxime-based compounds, and pyrazole-based compounds; and particularly preferably oxime-based compounds because when they are combined with the amidate compound represented by Formula (2), the blocking agent can be dissociated in a short period of time particularly even at a low temperature of less than 100° C.

Examples of alcohol-based compounds include methanol, ethanol, n-propyl alcohol, isopropyl alcohol, n-butyl alcohol, isobutyl alcohol, t-butyl alcohol, t-pentanol, ethylene glycol monoethyl ether, ethylene glycol monobutyl ether, diethylene glycol monoethyl ether, propylene glycol monomethyl ether, benzyl alcohol, and the like.

Examples of phenol-based compounds include phenol, thiophenol, methylthiophenol, xylenol, cresol, resorcinol, nitrophenol, chlorophenol, 2-hydroxypyridine, and the like.

Examples of amine-based compounds include diisopropylamine and the like.

Examples of lactam-based compounds include ε-caprolactam, δ-valerolactam, γ-butyrolactam, and the like; and preferably ε-caprolactam.

Preferred examples of oxime-based compounds include compounds represented by the following Formula (B).

Formula (B):

$$HO-N=R \qquad (B)$$

wherein R is a hydrogen atom or a $C_1$-$C_{20}$ alkyl group.

R is a hydrogen atom or a $C_1$-$C_{20}$ alkyl group, preferably a $C_1$-$C_{20}$ alkyl group, more preferably a $C_1$-$C_6$ alkyl group, and particularly preferably a $C_1$-$C_4$ alkyl group.

Examples of $C_1$-$C_{20}$ alkyl groups include methyl, ethyl, propyl, isopropyl, butyl, sec-butyl, tert-butyl, 1-methylpropyl, pentyl, hexyl, heptyl, octyl, 1-ethylpentyl, nonyl, 2-ethylhexyl, undecyl, tridecyl, pentadecyl, and heptadecyl groups.

Specific examples of oxime-based compounds include formaldehyde oxime, acetaldehyde oxime, acetone oxime, methyl ethyl ketoxime, methyl isobutyl ketoxime, and the like; and preferably methyl ethyl ketoxime.

Examples of pyrazole-based compounds include 1,2-pyrazole, 3,5-dimethylpyrazole, and the like. Examples of triazole-based compounds include 1,2,4-triazole and the like, and preferably 3,5-dimethylpyrazole.

Examples of active methylene-based compounds include methyl acetoacetate, ethyl acetoacetate, acetylacetone, methyl malonate, ethyl malonate, and the like.

The amidate compound represented by Formula (2) (hereinafter referred to as the amidate compound (2)) is explained.

Formula (2):

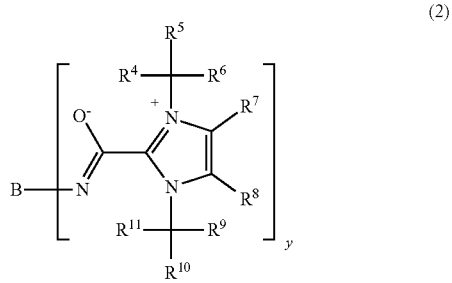

(2)

wherein B represents a substituted or unsubstituted hydrocarbon group; $R^4$, $R^5$, $R^6$, $R^9$, $R^{10}$, and $R^{11}$ are the same or different, and each represents a $C_1$-$C_{20}$ hydrocarbon group that may be substituted with a heteroatom; $R^7$ and $R^8$ are the same or different, and each represents a hydrogen atom or a $C_1$-$C_{20}$ hydrocarbon group that may be substituted with a heteroatom; $R^4$ and $R^5$, $R^5$ and $R^6$, $R^7$ and $R^8$, $R^9$ and $R^{10}$, or $R^{10}$ and $R^{11}$ may form a ring structure together with the carbon atoms to which they are bonded; y is an integer of 1 or more and 20 or less; and the group represented by $CR^4R^5R^6$ or the group represented by $CR^9R^{10}R^{11}$ may be an adamantyl group.

In one embodiment, in Formula (2), B is a substituted or unsubstituted hydrocarbon group, preferably a substituted or unsubstituted $C_1$-$C_{100}$ hydrocarbon group, more preferably a substituted or unsubstituted $C_1$-$C_{50}$ hydrocarbon group, and particularly preferably a substituted or unsubstituted $C_1$-$C_{30}$ hydrocarbon group. In another embodiment, B is a substituted or unsubstituted aromatic hydrocarbon group, preferably a substituted or unsubstituted $C_1$-$C_{100}$ aromatic hydrocarbon group, more preferably a substituted or unsubstituted $C_1$-$C_{50}$ aromatic hydrocarbon group, and particularly preferably a substituted or unsubstituted $C_1$-$C_{30}$ aromatic hydrocarbon group.

In the present specification, the "substituted or unsubstituted hydrocarbon groups" include (i) a hydrocarbon group that may have a substituent, (ii) a hydrocarbon group that may be substituted with a heteroatom, and (iii) a hydrocarbon group having a substituent and substituted with a heteroatom. Further, the "substituted or unsubstituted aromatic hydrocarbon groups" include (iv) an aromatic hydrocarbon group that may have a substituent, (v) an aromatic hydrocarbon group that may be substituted with a heteroatom, and (vi) an aromatic hydrocarbon group having a substituent and substituted with a heteroatom.

In B, the unsubstituted hydrocarbon group is, for example, a methyl, ethyl, propyl, isopropyl, butyl, sec-butyl, tert-butyl, pentyl, hexyl, heptyl, decyl, dodecyl, octadecyl, cyclopropyl, cyclopentyl, cyclohexyl, phenyl, naphthyl, benzyl, phenethyl, tolyl, or allyl group.

When B is a substituted hydrocarbon group, examples of substituents include halogen atoms, such as fluorine, chlorine, bromine, and iodine; alkylamino groups, such as methylamino; dialkylamino groups, such as dimethylamino; alkoxy groups, such as methoxy and ethoxy; aryloxy groups, such as phenoxy and naphthyloxy; aralkyloxy groups, such as benzyloxy and naphthylmethoxy; halogenated alkyl groups, such as trifluoromethyl; nitro groups, cyano groups, sulfonyl groups, alkylcarbonylamino groups, alkyloxycarbonylamino groups, (alkylamino)carbonylamino groups, (dialkylamino)carbonylamino groups, and the like. Moreover, the hydrocarbon group B may be substituted with at least one heteroatom, such as oxygen, nitrogen, or sulfur. When the hydrocarbon group B is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group.

Examples of the alkyl moiety of the above alkylamino groups, dialkylamino groups, alkoxy groups, halogenated alkyl groups, alkylcarbonylamino groups, alkyloxycarbonylamino groups, (alkylamino)carbonylamino groups, and (dialkylamino)carbonylamino groups include linear or branched $C_1$-$C_{12}$ alkyl groups, such as methyl, ethyl, propyl, isopropyl, n-butyl, isobutyl, sec-butyl, tert-butyl, pentyl, 1-ethylpentyl, heptyl, octyl, and 2-ethylhexyl. The number of carbon atoms in the alkyl group is preferably 1 to 8, and more preferably 1 or 2.

Examples of the aryl moiety of the above aryloxy groups include $C_6$-$C_{10}$ aryl groups. Specific examples of the aryl moiety include a phenyl group, a naphthyl group, and the like.

Examples of the aralkyl moiety of the above aralkyloxy groups include $C_7$-$C_{12}$ aralkyl groups. Specific examples of the aralkyl moiety include a benzyl group, a naphthylmethyl group, and the like.

The number of substituents is 1 to 5, preferably 1 to 3, and more preferably 1 or 2.

$R^7$ and $R^8$ are the same or different, and each represents a hydrogen atom or a $C_1$-$C_{20}$ hydrocarbon group that may be substituted with a heteroatom, and preferably a hydrogen atom.

y is an integer of 1 or more and 20 or less, preferably 1 to 6, more preferably 1 to 4, and particularly preferably 1 or 2.

$R^4$, $R^5$, $R^6$, $R^9$, $R^{10}$, and $R^{11}$ are the same or different, and each represents a $C_1$-$C_{20}$ hydrocarbon group that may be substituted with a heteroatom, preferably a $C_1$-$C_{12}$ hydrocarbon group that may be substituted with a heteroatom, more preferably a $C_1$-$C_{12}$ hydrocarbon group that may be substituted with a heteroatom, even more preferably a $C_1$-$C_6$ hydrocarbon group that may be substituted with a heteroatom, and particularly preferably a $C_1$-$C_4$ hydrocarbon group that may be substituted with a heteroatom. Examples of hydrocarbon groups include methyl, ethyl, propyl, n-butyl, s-butyl, t-butyl, pentyl, neopentyl, hexyl, octyl, benzyl, and phenyl groups; preferably methyl, ethyl, neopentyl, and phenyl groups; and more preferably methyl and neopentyl groups.

In another embodiment, $R^4$, $R^5$, $R^9$, and $R^{10}$ are preferably the same or different, and each represents a $C_1$-$C_4$ hydrocarbon group that may be substituted with a heteroatom, and $R^6$ and $R^{11}$ are preferably the same or different, and each represents a $C_1$-$C_{12}$ hydrocarbon group that may be substituted with a heteroatom.

$R^4$, $R^5$, $R^6$, $R^7$, $R^8$, $R^9$, $R^{10}$, and $R^{11}$ may form a ring structure together with the carbon atoms to which they are bonded.

When $R^4$, $R^5$, $R^6$, $R^7$, $R^8$, $R^9$, $R^{10}$, and $R^{11}$ form a ring structure together with the carbon atoms to which they are bonded, for example, a benzimidazolium ring structure represented by the following Formula (2x) can be formed.

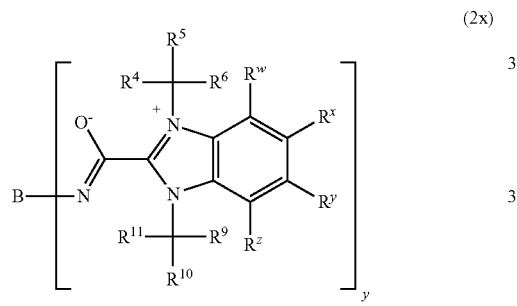
(2x)

wherein B, $R^4$, $R^5$, $R^6$, $R^9$, $R^{10}$, $R^{11}$, and y are as defined above; $R^w$, $R^x$, $R^y$, and $R^z$ each represent a hydrogen atom or a $C_1$-$C_{20}$ hydrocarbon group; and the group represented by $CR^4R^5R^6$ or the group represented by $CR^9R^{10}R^{11}$ may be an adamantyl group.

Further, the group represented by $CR^4R^5R^6$ or the group represented by $CR^9R^{10}R^{11}$ may be an adamantyl group, and may be, for example, a 1-adamantyl group represented by the following Formula (IV):

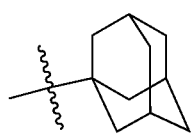
(IV)

When a 1-adamantyl group represented by Formula (IV) is present, for example, a structure having a 1-adamantyl group represented by the following Formula (2y) can be formed.

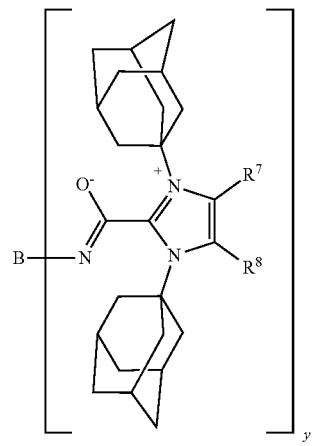
(2y)

wherein B, $R^7$, $R^8$, and y are as defined above.

The amidate compound represented by Formula (2) is preferably an amidate compound represented by Formula (2-1), Formula (2-2), or Formula (2-3).

Formula (2-1):

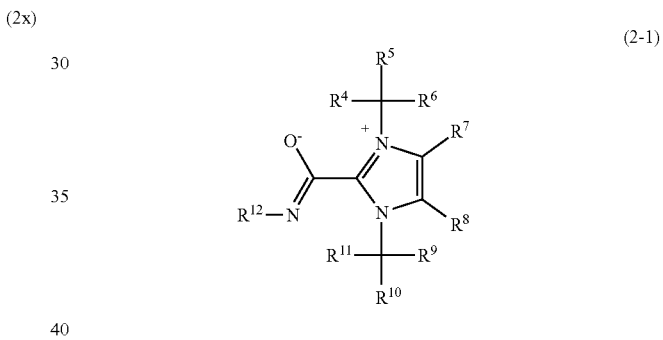
(2-1)

wherein $R^4$, $R^5$, $R^6$, $R^7$, $R^8$, $R^9$, $R^{10}$, and $R^{11}$ are as defined above; the group represented by $CR^4R^5R^6$ or the group represented by $CR^9R^{10}R^{11}$ may be an adamantyl group; and $R^{12}$ represents a substituted or unsubstituted hydrocarbon group.

Formula (2-2):

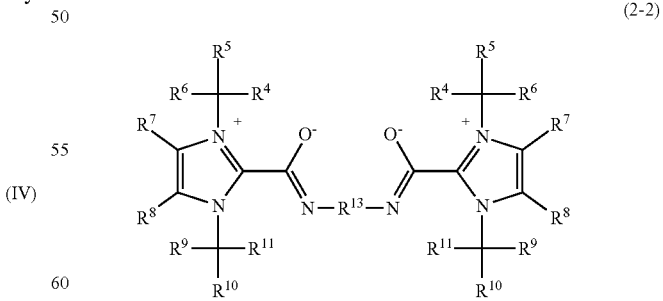
(2-2)

wherein $R^4$, $R^5$, $R^6$, $R^7$, $R^8$, $R^9$, $R^{10}$, and $R^{11}$ are as defined above; the group represented by $CR^4R^5R^6$ or the group represented by $CR^9R^{10}R^{11}$ may be an adamantyl group; and $R^{13}$ represents a substituted or unsubstituted divalent hydrocarbon group.

Formula (2-3):

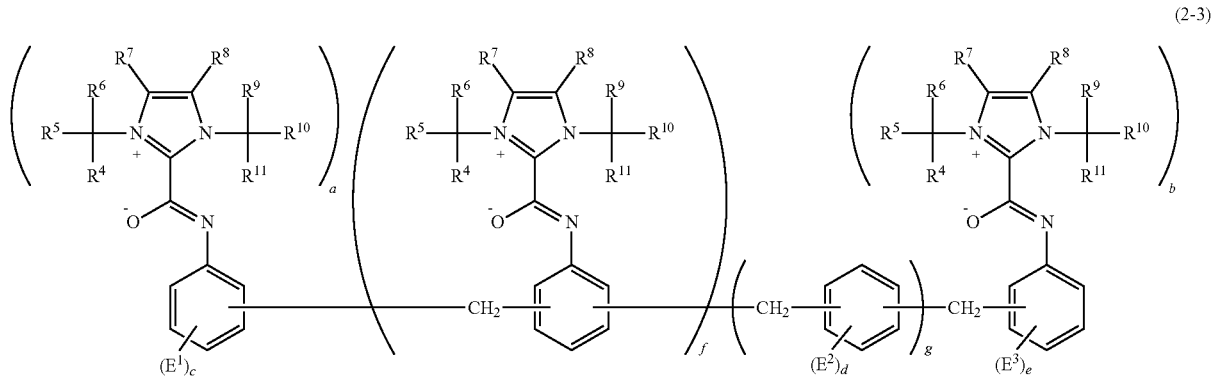

(2-3)

wherein $R^4$, $R^5$, $R^6$, $R^7$, $R^8$, $R^9$, $R^{10}$, and $R^{11}$ are as defined above; the group represented by $CR^4R^5R^6$ or the group represented by $CR^9R^{10}R^{11}$ may be an adamantyl group; $E^1$, $E^2$, and $E^3$ each independently represents a substituted or unsubstituted hydrocarbon group, a halogen atom, an alkylamino group, a dialkylamino group, an alkoxy group, an aryloxy group, an aralkylaryloxy group, a nitro group, a cyano group, a sulfonyl group, an (alkylamino)carbonylamino group, a (dialkylamino)carbonylamino group, or an isocyanate group; f and g are each independently an integer of 0 to 4; a and b are each 0 or 1; and c, d, and e are each independently an integer of 0 to 4, provided that when f is 0, at least one of a or b is 1.

In Formula (2-1), $R^4$, $R^5$, $R^6$, $R^7$, $R^8$, $R^9$, $R^{10}$, and $R^{11}$ are as defined above, and the group represented by $CR^4R^5R^6$ or the group represented by $CR^9R^{10}R^{11}$ may be an adamantyl group.

$R^{12}$ is a substituted or unsubstituted hydrocarbon group, preferably a substituted or unsubstituted $C_1$-$C_{50}$ hydrocarbon group, more preferably a substituted or unsubstituted $C_1$-$C_{30}$ hydrocarbon group, and particularly preferably a substituted or unsubstituted $C_1$-$C_{12}$ hydrocarbon group. Specific examples include methyl, ethyl, propyl, isopropyl, butyl, sec-butyl, tert-butyl, pentyl, hexyl, heptyl, decyl, dodecyl, octadecyl, cyclopropyl, cyclopentyl, cyclohexyl, phenyl, naphthyl, benzyl, phenethyl, tolyl, and allyl groups; and preferably benzyl and phenyl groups.

When $R^{12}$ is substituted, examples of substituents include halogen atoms, such as fluorine, chlorine, bromine, and iodine; alkylamino groups, such as methylamino; dialkylamino groups, such as dimethylamino; alkoxy groups, such as methoxy and ethoxy; aryloxy groups, such as phenoxy and naphthyloxy; aralkyloxy groups, such as benzyloxy and naphthylmethoxy; halogenated alkyl groups, such as trifluoromethyl; nitro groups, cyano groups, sulfonyl groups, alkylcarbonylamino groups, alkyloxycarbonylamino groups, (alkylamino)carbonylamino groups, (dialkylamino)carbonylamino groups, isocyanate groups, and the like. Moreover, the hydrocarbon group $R^{12}$ may be substituted with at least one heteroatom, such as oxygen, nitrogen, or sulfur. When the hydrocarbon group is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group. When $R^{12}$ is substituted, the number of substituents is preferably 1 to 5, more preferably 1 to 3, and even more preferably 1 to 2.

Examples of the alkyl moiety of the above alkylamino groups, dialkylamino groups, alkoxy groups, halogenated alkyl groups, alkylcarbonylamino groups, alkyloxycarbonylamino groups, (alkylamino)carbonylamino groups, and (dialkylamino)carbonylamino groups include linear or branched $C_1$-$C_{12}$ alkyl groups, such as methyl, ethyl, propyl, isopropyl, butyl, sec-butyl, tert-butyl, pentyl, 1-ethylpentyl, heptyl, octyl, and 2-ethylhexyl. The number of carbon atoms in the alkyl group is preferably 1 to 8, and more preferably 1 or 2.

Examples of the aryl moiety of the above aryloxy groups include $C_6$-$C_{10}$ aryl groups. Specific examples of the aryl moiety include a phenyl group, a naphthyl group, and the like.

Examples of the aralkyl moiety of the above aralkyloxy groups include $C_7$-$C_{12}$ aralkyl groups. Specific examples of the aralkyl moiety include a benzyl group, a naphthylmethyl group, and the like.

The number of substituents is 1 to 5, preferably 1 to 3, and more preferably 1 or 2.

$R^{12}$ is preferably a hydrocarbon group that may be substituted with a halogen atom or a hydrocarbon group that may be substituted with a heteroatom. Among these, $R^{12}$ is preferably a $C_1$-$C_{50}$ hydrocarbon group that may be substituted with a halogen atom or a $C_1$-$C_{50}$ hydrocarbon group that may be substituted with a heteroatom, more preferably a $C_1$-$C_{30}$ hydrocarbon group that may be substituted with a halogen atom or a $C_1$-$C_{30}$ hydrocarbon group that may be substituted with a heteroatom, and particularly preferably a $C_1$-$C_{12}$ hydrocarbon group that may be substituted with a halogen atom or a $C_1$-$C_{12}$ hydrocarbon group that may be substituted with a heteroatom. The hydrocarbon group is preferably an aromatic hydrocarbon group, such as aryl or arylalkyl.

In $R^{12}$, the hydrocarbon group substituted with a halogen atom is, for example, a chlorophenyl group.

In $R^{12}$, the $C_1$-$C_{20}$ hydrocarbon group substituted with a heteroatom is, for example, a 2-methoxymethyl group, a 2-ethoxymethyl group, or a 2-(dimethylamino)methyl group.

In Formula (2-2), $R^4$, $R^5$, $R^6$, $R^7$, $R^8$, $R^9$, $R^{10}$, and $R^{11}$ are as defined above, and the group represented by $CR^4R^5R^6$ or the group represented by $CR^9R^{10}R^{11}$ may be an adamantyl group. $R^{13}$ is a substituted or unsubstituted divalent hydrocarbon group, preferably a substituted or unsubstituted $C_1$-$C_{100}$ divalent hydrocarbon group, more preferably a substituted or unsubstituted divalent $C_1$-$C_{50}$ hydrocarbon group, and particularly preferably a substituted or unsubstituted $C_1$-$C_{30}$ divalent hydrocarbon group. Specific examples include alkylene groups, such as ethylene, n-propylene, n-butylene, n-pentylene, n-hexylene, n-heptylene, n-octylene, n-nonylene, n-decylene, n-dodecylene, n-octadecylene, cyclohexylene, cyclohexane-1,2-diylbismethylene, and cyclohexane-1,4-diylbismethylene; arylene groups, such as m-phenylene, p-phenylene, 2-methyl-m-phenylene, 4-methyl-m-phenylene, and naphthylene; arylalkylene groups, such as phenylethylene, 1-phenylpropylene, 2-phenylpropylene, 1-phenylbutylene, 2-phenylbutylene, naphthylmethylene, and naphthylethylene; arylenealkylene groups, such as p-xylylene, and alkylenearylene groups, such as methylene diphenylene and polymethylene polyphenylene, obtained by suitably combining the above alkylene groups and arylene groups; and the like. These divalent hydrocarbon groups may be repeated or combined to constitute one divalent hydrocarbon group.

When the divalent hydrocarbon group $R^{13}$ is substituted, examples of substituents include halogen atoms, such as fluorine, chlorine, bromine, and iodine; alkylamino groups, such as methylamino; dialkylamino groups, such as dimethylamino; alkoxy groups, such as methoxy and ethoxy; aryloxy groups, such as phenoxy and naphthyloxy; aralkyloxy groups, such as benzyloxy and naphthylmethoxy; halogenated alkyl groups, such as trifluoromethyl; nitro groups, cyano groups, sulfonyl groups, (alkylamino)carbonylamino groups, (dialkylamino)carbonylamino groups, isocyanate groups, and the like. Moreover, the hydrocarbon group $R^{13}$ may be substituted with at least one heteroatom, such as oxygen, nitrogen, or sulfur. When the hydrocarbon group is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group. When $R^{13}$ is substituted, the number of substituents is preferably 1 to 5, more preferably 1 to 3, and even more preferably 1 to 2.

$R^{13}$ is preferably a divalent hydrocarbon group that may be substituted with a halogen atom or a divalent hydrocarbon group that may be substituted with a heteroatom. Among these, $R^{13}$ is preferably a $C_1$-$C_{50}$ divalent hydrocarbon group that may be substituted with a halogen atom or a $C_1$-$C_{50}$ divalent hydrocarbon group that may be substituted with a heteroatom, more preferably a $C_1$-$C_{30}$ divalent hydrocarbon group that may be substituted with a halogen atom or a $C_1$-$C_{30}$ divalent hydrocarbon group that may be substituted with a heteroatom, and particularly preferably a $C_1$-$C_{12}$ divalent hydrocarbon group that may be substituted with a halogen atom or a $C_1$-$C_{12}$ divalent hydrocarbon group that may be substituted with a heteroatom.

Examples of the alkyl moiety of the above alkylamino groups, dialkylamino groups, alkoxy groups, halogenated alkyl groups, alkylcarbonylamino groups, alkyloxycarbonylamino groups, (alkylamino)carbonylamino groups, and (dialkylamino)carbonylamino groups include linear or branched $C_1$-$C_{12}$ alkyl groups, such as methyl, ethyl, propyl, isopropyl, butyl, sec-butyl, tert-butyl, pentyl, 1-ethylpentyl, heptyl, octyl, and 2-ethylhexyl. The number of carbon atoms in the alkyl group is preferably 1 to 8, and more preferably 1 or 2.

Examples of the aryl moiety of the above aryloxy groups include $C_6$-$C_{10}$ aryl groups. Specific examples of the aryl moiety include a phenyl group, a naphthyl group, and the like.

Examples of the aralkyl moiety of the above aralkyloxy groups include $C_7$-$C_{12}$ aralkyl groups. Specific examples of the aralkyl moiety include a benzyl group, a naphthylmethyl group, and the like.

The number of substituents is 1 to 5, preferably 1 to 3, and more preferably 1 or 2.

In Formula (2-3), $R^4$, $R^5$, $R^6$, $R^7$, $R^1$, $R^9$, $R^{10}$, and $R^{11}$ are as defined above, and the group represented by $CR^4R^5R^6$ or the group represented by $CR^9R^{10}R^{11}$ may be an adamantyl group.

$E^1$, $E^2$, and $E^3$ are each independently a substituted or unsubstituted hydrocarbon group, a halogen atom, an alkylamino group, a dialkylamino group, an alkoxy group, an aryloxy group, an aralkyloxy group, a nitro group, a cyano group, a sulfonyl group, an (alkylamino)carbonylamino group, a (dialkylamino)carbonylamino group, or an isocyanate group; preferably a hydrocarbon group that may be substituted with a halogen atom, a hydrocarbon group that may be substituted with a heteroatom, an (alkylamino)carbonylamino group, a (dialkylamino)carbonylamino group, or an isocyanate group; and more preferably an (alkylamino)carbonylamino group or a (dialkylamino)carbonylamino group.

When $E^1$, $E^2$, or $E^3$ is a substituted or unsubstituted hydrocarbon group, it is preferably a substituted or unsubstituted $C_1$-$C_{50}$ hydrocarbon group, more preferably a substituted or unsubstituted $C_1$-$C_{30}$ hydrocarbon group, and even more preferably a substituted or unsubstituted $C_1$-$C_{12}$ hydrocarbon group.

When $E^1$, $E^2$, or $E^3$ is a substituted hydrocarbon group, examples of substituents include halogen atoms, such as fluorine, chlorine, bromine, and iodine; alkylamino groups, such as methylamino; dialkylamino groups, such as dimethylamino; alkoxy groups, such as methoxy and ethoxy; aralkyloxy groups, such as benzyloxy; halogenated alkyl groups, such as trifluoromethyl; nitro groups, cyano groups, sulfonyl groups; carbonylamino groups, such as alkylcarbonylamino, alkyloxycarbonylamino, (alkylamino)carbonylamino, and (dialkylamino)carbonylamino; and the like.

The hydrocarbon group $E^1$, $E^2$, or $E^3$ may be substituted with at least one heteroatom, such as oxygen, nitrogen, or sulfur. When the hydrocarbon group $E^1$, $E^2$, or $E^3$ is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group.

Examples of the alkyl moiety of the above alkylamino groups, dialkylamino groups, alkoxy groups, halogenated alkyl groups, alkylcarbonylamino groups, alkyloxycarbonylamino groups, (alkylamino)carbonylamino groups, and (dialkylamino)carbonylamino groups include linear or branched $C_1$-$C_{12}$ alkyl groups, such as methyl, ethyl, propyl, isopropyl, n-butyl, isobutyl, sec-butyl, tert-butyl, pentyl, 1-ethylpentyl, heptyl, octyl, and 2-ethylhexyl. The number of carbon atoms in the alkyl group is preferably 1 to 8, and more preferably 1 or 2.

Examples of the aryl moiety of the above aryloxy groups include $C_6$-$C_{10}$ aryl groups. Specific examples of the aryl moiety include a phenyl group, a naphthyl group, and the like.

Examples of the aralkyl moiety of the above aralkyloxy groups include $C_7$-$C_{12}$ aralkyl groups. Specific examples of the aralkyl moiety include a benzyl group, a naphthylmethyl group, and the like.

The number of substituents is 1 to 5, preferably 1 to 3, and more preferably 1 or 2.

When $E^1$, $E^2$, or $E^3$ is a hydrocarbon group that may be substituted with a halogen atom or a hydrocarbon group that may be substituted with a heteroatom, it is preferably a $C_1$-$C_{50}$ hydrocarbon group that may be substituted with a halogen atom or a $C_1$-$C_{50}$ hydrocarbon group that may be substituted with a heteroatom, more preferably a $C_1$-$C_{30}$ hydrocarbon group that may be substituted with a halogen atom or a $C_1$-$C_{30}$ hydrocarbon group that may be substituted with a heteroatom, and particularly preferably a $C_1$-$C_{12}$ hydrocarbon group that may be substituted with a halogen atom or a $C_1$-$C_{12}$ hydrocarbon group that may be substituted with a heteroatom.

Moreover, the hydrocarbon group in the hydrocarbon group that may be substituted with a halogen atom or the hydrocarbon group that may be substituted with a heteroatom is preferably an aromatic hydrocarbon group, such as aryl or arylalkyl. Specific examples of the hydrocarbon group in the hydrocarbon group that may be substituted with a halogen atom or the hydrocarbon group that may be substituted with a heteroatom include methyl, ethyl, propyl, isopropyl, butyl, sec-butyl, tert-butyl, pentyl, hexyl, heptyl, decyl, dodecyl, octadecyl, cyclopropyl, cyclopentyl, cyclohexyl, phenyl, naphthyl, benzyl, phenethyl, tolyl, and allyl groups; and preferably benzyl and phenyl groups.

When $E^1$, $E^2$, or $E^3$ is a hydrocarbon group that may be substituted with a halogen atom, examples of the halogen atom include fluorine, chlorine, bromine, iodine, and the like. Further, the hydrocarbon groups $E^1$, $E^2$, and $E^3$ may be substituted with a heteroatom, such as oxygen, nitrogen, or sulfur. When the hydrocarbon group $E^1$, $E^2$, or $E^3$ is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group.

In $E^1$, $E^2$, or $E^3$, the hydrocarbon group substituted with a halogen atom is, for example, a chlorophenyl group.

In $E^1$, $E^2$, or $E^3$, the $C_1$-$C_{20}$ hydrocarbon group substituted with a heteroatom is, for example, a 2-methoxyrethyl group, a 2-ethoxymethyl group, or a 2-(dimethylamino)methyl group.

When $E^1$, $E^2$, and $E^3$ are each independently a halogen atom, examples of the halogen atom include fluorine, chlorine, bromine, iodine, and the like.

When $E^1$, $E^2$, and $E^3$ are alkylamino groups, dialkylamino groups, alkoxy groups, (alkylamino)carbonylamino groups, or (dialkylamino)carbonylamino groups, examples of the alkyl moiety of these groups include linear or branched $C_1$-$C_6$ alkyl groups, such as methyl, ethyl, n-propyl, isopropyl, n-butyl, isobutyl, sec-butyl, tert-butyl, and n-pentyl. The number of carbon atoms in the alkyl group is preferably 1 to 3, and more preferably 1 or 2.

When $E^1$, $E^2$, and $E^3$ are aryloxy groups, examples of the aryl moiety of the above aryloxy groups include $C_6$-$C_{10}$ aryl groups. Specific examples of the aryl moiety include a phenyl group, a naphthyl group, and the like.

When $E^1$, $E^2$, and $E^3$ are aralkyloxy groups, examples of the aralkyl moiety of the above aralkyloxy groups include $C_7$-$C_{12}$ aralkyl groups. Specific examples of the aralkyl moiety include a benzyl group, a naphthylmethyl group, and the like.

f and g each independently represent an integer of 0 to 4. a and b are each 0 or 1, and c, d, and e each independently represent an integer of 0 to 4. However, when f is 0, at least one of a or b is 1.

Examples of the amidate compound (2) include the following compounds. tBu represents a t-butyl group, tOct represents a 1,1,3,3-tetramethylbutyl group, 1Ad represents a 1-adamantyl group, Me represents a methyl group, Hept represents a heptyl group, and 1EtPent represents a 1-ethylpentyl group.

| R | R' | |
|---|---|---|
| tBu | tBu | (2-1-1) |
| tOct | tOct | (2-1-2) |
| 1Ad | 1Ad | (2-1-3) |

| R | R' | |
|---|---|---|
| iBu | tBu | (2-1-4) |
| tOct | tOct | (2-1-5) |
| 1Ad | 1Ad | (2-1-6) |

| R | R' | R" | |
|---|---|---|---|
| tBu | tBu | Me | (2-1-7) |
| tBu | tBu | Hept | (2-1-8) |
| tBu | tBu | 1EtPent | (2-1-9) |
| tOct | tOct | Me | (2-1-10) |
| tOct | tOct | Hept | (2-1-11) |
| tOct | tOct | 1EtPent | (2-1-12) |
| 1Ad | 1Ad | Me | (2-1-13) |
| 1Ad | 1Ad | Hept | (2-1-14) |
| 1Ad | 1Ad | 1EtPent | (2-1-15) |

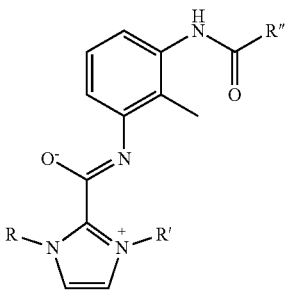

| R | R' | R'' | |
|---|---|---|---|
| tBu | tBu | Me | (2-1-16) |
| tBu | tBu | Hept | (2-1-17) |
| tBu | tBu | 1EtPent | (2-1-18) |
| tOct | tOct | Me | (2-1-19) |
| tOct | tOct | Hept | (2-1-20) |
| tOct | tOct | 1EtPent | (2-1-21) |
| 1Ad | 1Ad | Me | (2-1-16) |
| 1Ad | 1Ad | Hept | (2-1-17) |
| 1Ad | 1Ad | 1EtPent | (2-1-18) |

| R | R' | R'' | |
|---|---|---|---|
| tBu | t.Bu | Me | (2-1-19) |
| tBu | t Bu | Hept | (2-1-20) |
| tBu | tBu | 1BtPent | (2-1-21) |
| tOct | tOct | Me | (2-1-22) |
| tOct | tOct | Hept | (2-1-23) |
| tOct | tOct | 1EtPent | (2-1-24) |
| 1Ad | 1Ad | Me | (2-1-25) |
| 1Ad | 1Ad | Hept | (2-1-26) |
| 1Ad | 1Ad | 1EtPent | (2-1-27) |

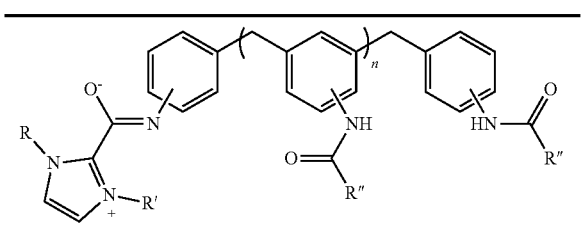

| R | R' | R'' | |
|---|---|---|---|
| tBu | tBu | Me | (2-1-28) |
| tBu | tBu | Hept | (2-1-29) |
| tBu | tBu | 1EtPent | (2-1-30) |
| tOct | tOct | $CH_3$ | (2-1-31) |
| tOct | tOct | Hept | (2-1-32) |
| tOct | tOct | 1EtPent | (2-1-33) |
| 1Ad | 1Ad | Me | (2-1-34) |
| 1Ad | 1Ad | Hept | (2-1-35) |
| 1Ad | 1Ad | 1EtPent | (2-1-36) |

In Formulas (2-1-28) to (2-1-36), n is an integer of 0 to 4.

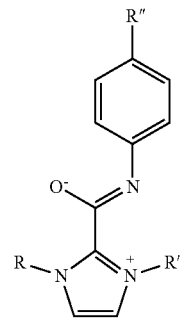

| R | R' | R'' | |
|---|---|---|---|
| tBu | tBu | Me | (2-1-37) |
| tBu | tBu | MeO | (2-1-38) |
| tBu | tBu | Cl | (2-1-39) |
| tOct | tOct | Me | (2-1-40) |
| tOct | tOct | MeO | (2-1-41) |
| tOct | tOct | Cl | (2-1-42) |
| 1Ad | 1Ad | Me | (2-1-43) |
| 1Ad | 1Ad | MeO | (2-1-40) |
| 1Ad | 1Ad | Cl | (2-1-45) |

| R | R' | R'' | |
|---|---|---|---|
| tBu | tBu | Me | (2-1-46) |
| tBu | tBu | Hept | (2-1-47) |
| tBu | tBu | 1EtPent | (2-1-48) |
| tOct | tOct | Me | (2-1-49) |
| tOct | tOct | Hept | (2-1-50) |
| tOct | tOct | 1EtPent | (2-1-51) |
| 1Ad | 1Ad | Me | (2-1-52) |
| 1Ad | 1Ad | Hept | (2-1-53) |
| 1Ad | 1Ad | 1EtPent | (2-1-54) |

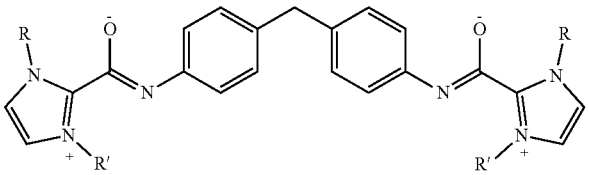

| R | R' | |
|---|---|---|
| tBu | tBu | (2-2-1) |
| tOct | tOct | (2-2-2) |
| 1Ad | 1Ad | (2-2-3) |

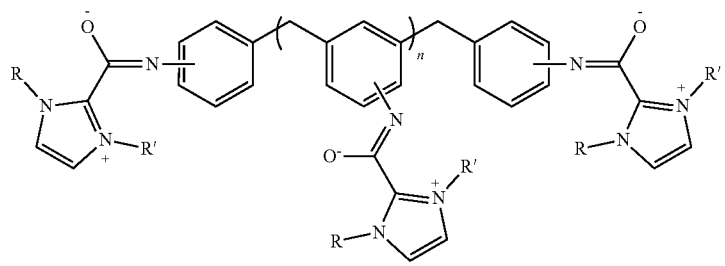

| R | R' | |
|---|---|---|
| tBu | tBu | (2-3-1) |
| tOct | tOct | (2-3-2) |
| 1Ad | 1Ad | (2-3-3) |

In Formulas (2-3-1) to (2-3-3), n is an integer of 0 to 4.

The amidate compound (2) is preferably any of compounds represented by Formulas (2-1-1) to (2-1-6), (2-1-7), (2-1-9), (2-1-10), (2-1-12), (2-1-13), (2-1-15), (2-1-37) to (2-1-45), (2-2-1) to (2-2-3), and (2-3-1) to (2-3-3); and more preferably a compound represented by Formula (2-1-1), (2-1-2), or (2-3-2).

The amidate compound (2) can be produced, for example, by the methods shown below.

Method 1: An imidazolium carboxylate represented by Formula (5) is reacted with an ester carbonate represented by Formula (6) (Reaction 1), and the obtained reaction product is reacted with an isocyanate compound represented by Formula (10) (Reaction 2).

Method 2: An imidazolium carboxylate is reacted with an isocyanate compound.

Method 3: The imidazolium-2-carboxylate compound described in PTL 1 is reacted with an isocyanate compound.

Method 4: The imidazolium-2-ylidene compound described in Structural Chemistry, 2013, vol. 24, pp. 2059-2068, is reacted with an isocyanate compound.

Method 1 is explained below.
Reaction 1:

An imidazolium carboxylate represented by the following Formula (5) (hereinafter referred to as the imidazolium carboxylate (5)) is reacted with an ester carbonate represented by the following Formula (6) (hereinafter referred to as the ester carbonate (6)).

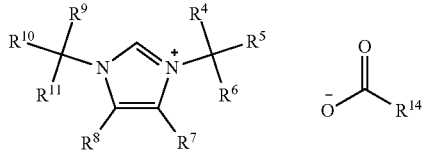

wherein $R^4$, $R^5$, $R^6$, $R^7$, $R^8$, $R^9$, $R^{10}$, and $R^{11}$ are each as defined above, the group represented by $CR^4R^5R^6$ or the group represented by $CR^9R^{10}R^{11}$ may be an adamantyl group, and $R^{14}$ represents a hydrogen atom or a $C_1$-$C_{20}$ hydrocarbon group that may be substituted with a heteroatom.

Formula (6):

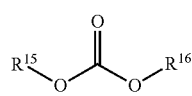

wherein $R^{15}$ and $R^{16}$ are the same or different, and each represents a $C_1$-$C_6$ hydrocarbon group, and $R^{15}$ and $R^{16}$ may form a ring structure together with the oxygen atoms to which they are bonded.

Reaction 2:

Then, the obtained reaction product is reacted with an isocyanate compound represented by the following Formula (10) optionally in the presence of a solvent to produce the amidate compound (2).

Formula (10):

wherein B and y are each as defined above.

The imidazolium carboxylate (5) is explained.

In Formula (5), $R^4$, $R^5$, $R^6$, $R^7$, $R^1$, $R^9$, $R^{10}$, and $R^{11}$ are each as defined above, and the group represented by $CR^4R^5R^6$ or the group represented by $CR^9R^{10}R^{11}$ may be an adamantyl group.

$R^{14}$ represents a hydrogen atom or a $C_1$-$C_{20}$ hydrocarbon group that may be substituted with a heteroatom, and preferably a $C_1$-$C_{20}$ hydrocarbon group that may be substituted with a heteroatom. The $C_1$-$C_{20}$ hydrocarbon group that may be substituted with a heteroatom is preferably a $C_1$-$C_8$ hydrocarbon group that may be substituted with a heteroatom, and particularly preferably a $C_1$ or $C_2$ hydrocarbon group that may be substituted with a heteroatom. Examples of the hydrocarbon group in the $C_1$-$C_{20}$ hydrocarbon group that may be substituted with a heteroatom include methyl, ethyl, propyl, isopropyl, butyl, sec-butyl, tert-butyl, pentyl, hexyl, heptyl, octyl, 1-ethylpentyl, nonyl, 2-ethylhexyl, undecyl, tridecyl, pentadecyl, heptadecyl, vinyl, allyl, benzyl, cyclohexyl, adamantyl, and phenyl groups; preferably methyl, ethyl, propyl, isopropyl, butyl, heptyl, cyclohexyl, 1-ethylpentyl, and phenyl groups; and particularly preferably methyl, ethyl, heptyl, and 1-ethylpentyl groups.

In $R^{14}$, the heteroatom is, for example, a nitrogen atom, an oxygen atom, a sulfur atom, or the like. When the hydrocarbon group is substituted with at least one heteroatom, such as oxygen, nitrogen, or sulfur, the hydrocarbon group has at least one group, such as —O—, —N<, —NH—, —S—, or —SO$_2$—, and the hydrocarbon chain is interrupted by such a group. When the hydrocarbon group is substituted with at least one heteroatom, such as oxygen, nitrogen, or sulfur, it is preferable that the hydrocarbon group is substituted with an oxygen atom, and that the hydrocarbon chain is interrupted by an —O— group. In another embodiment, when the hydrocarbon group is substituted with at least one heteroatom, such as oxygen, nitrogen, or sulfur, a hydrocarbon group having a group such as —OH or —NH$_2$ may be formed.

In $R^{14}$, the $C_1$-$C_{20}$ hydrocarbon group substituted with a heteroatom is, for example, a 2-methoxymethyl group, a 2-ethoxymethyl group, or a 2-(dimethylamino)methyl group.

In Formula (5), when two adjacent groups selected from the group consisting of $R^4$, $R^5$, $R^6$, $R^7$, $R^1$, $R^9$, $R^{10}$, and $R^{11}$ form a ring structure together with the carbon atoms to which they are bonded, for example, a benzimidazolium ring structure (5x) shown below can be formed.

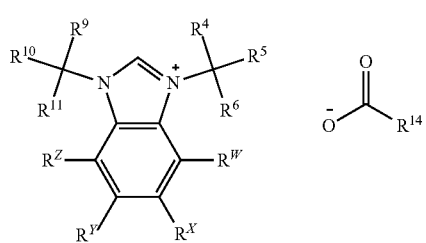

wherein $R^4$, $R^5$, $R^6$, $R^9$, $R^{10}$, $R^{11}$, $R^{14}$, $R^w$, $R^x$, $R^y$, and $R^z$ are each as defined above.

Further, in Formula (5), the group represented by $CR^4R^5R^6$ or the group represented by $CR^9R^{10}R^{11}$ may be an adamantyl group. In this case, for example, a structure (5y) having a 1-adamantyl group shown below can be formed.

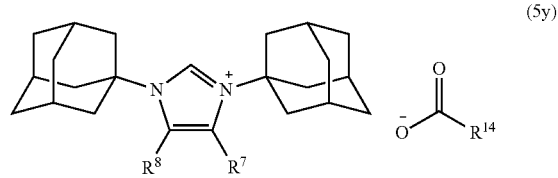

wherein $R^7$, $R^8$, and $R^{14}$ are each as defined above.

Examples of the imidazolium carboxylate (5) include 1,3-di-tert-butylimidazolium formate, 1,3-bis(1,1,3,3-tetramethylbutyl) imidazolium formate, and 1,3-bis(1-adamantyl) imidazolium formate;

1,3-di-tert-butylimidazolium acetate, 1,3-bis(1,1,3,3-tetramethylbutyl)imidazolium acetate, and 1,3-bis(1-adamantyl)imidazolium acetate; and 1,3-di-tert-butylimidazolium 2-ethylhexanoate, 1,3-bis(1,1,3,3-tetramethylbutyl) imidazolium 2-ethylhexanoate, and 1,3-bis(1-adamantyl) imidazolium 2-ethylhexanoate.

Preferred among these are 1,3-di-t-butylimidazolium acetate and 1,3-bis(1,1,3,3-tetramethylbutyl) imidazolium acetate.

The imidazolium carboxylate (5) may be a commercial product. The imidazolium carboxylate (5) may be obtained by a known method, or produced by the method explained below.

The imidazolium carboxylate represented by Formula (5) is obtained by reacting a dicarbonyl compound represented by the following Formula (7), amine compounds represented by the following Formulas (8x) and (8y), formaldehyde, and a carboxylic acid represented by the following Formula (9).

Formula (7):

wherein $R^7$ and $R^8$ are as defined above.

Formula (8x):

wherein $R^4$, $R^5$, and $R^6$ are as defined above, and the group represented by $CR^4R^5R^6$ may be an adamantyl group.

Formula (8y):

wherein $R^9$, $R^{10}$, and $R^{11}$ are as defined above, and the group represented by $CR^9R^{10}R^{11}$ may be an adamantyl group.

Formula (9):

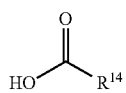

wherein $R^{14}$ is as defined above.

The dicarbonyl compound represented by Formula (7) (hereinafter referred to as the dicarbonyl compound (7)) is preferably, for example, glyoxal, diacetyl, 3,4-hexanedione, 2,3-pentanedione, 2,3-heptanedione, 5-methyl-2,3-hexanedione, 3-methyl-2,3-cyclopentanedione, 1,2-cyclohexanedione, 1-phenyl-1,2-propanedione, or dibenzoyl; more preferably glyoxal or diacetyl; and even more preferably glyoxal.

Examples of the amine compound represented by Formula (8x) (hereinafter referred to as the amine compound (8x)) and the amine compound represented by Formula (8y) (hereinafter referred to as the amine compound (8y)) include tert-butylamine, 1,1,3,3-tetramethylbutylamine, and 1-adamantylamine; and preferably 1,1,3,3-tetramethylbutylamine.

Preferred examples of the carboxylic acid represented by Formula (9) (hereinafter referred to as the carboxylic acid (9)) include carboxylic acids, such as formic acid, acetic acid, propionic acid, butyric acid, pentanoic acid, hexanoic acid, heptanoic acid, octanoic acid, 2-ethylhexanoic acid, capric acid, lauric acid, tetradecyl acid, palmitic acid, octadecyl acid, cyclohexanoic acid, ethoxyacetic acid, propoxyacetic acid, 2-(2-methoxyethoxy)acetic acid, 2-(2-ethoxyethoxy)acetic acid, 2-(2-propoxyethoxy)acetic acid, 3-methoxypropanoic acid, 3-ethoxypropanoic acid, 3-(2-methoxyethoxy)propanoic acid, 3-(2-ethoxyethoxy)propanoic acid, 3-(2-propoxyethoxy)propanoic acid, 3-(3-methoxypropoxy)propanoic acid, 3-(3-ethoxypropoxy)propanoic acid, 3-(3-propoxypropoxy)propanoic acid, oleic acid, linoleic acid, sorbic acid, benzoic acid, phthalic acid, isophthalic acid, terephthalic acid, lactic acid, salicylic acid, and trifluoroacetic acid; more preferably formic acid, acetic acid, propionic acid, butyric acid, pentanoic acid, hexanoic acid, heptanoic acid, octanoic acid, and 2-ethylhexanoic acid; and particularly preferably acetic acid and 2-ethylhexanoic acid.

As the dicarbonyl compound (7), an aqueous solution or an alcohol solution, such as methanol or butanol, may be used as it is.

The amounts of the amine compound (8x) and amine compound (8y) (the amine compound (8x) and amine compound (8y) are hereinafter correctively referred to as the amine compound (8)) used are generally such that the amount of the amine compound (8) is 0.1 to 10 mol, and preferably 0.5 to 3 mol, per mol of the dicarbonyl compound (7). 2 mol of the amine compound (8) is reacted per mol of the dicarbonyl compound (7) to form 1 mol of the imidazolium carboxylate (5); however, for example, if the amount of the amine compound (8) is less than 2 mol, the dicarbonyl compound (7) (raw material) and a polymer of the dicarbonyl compound (7) will exist in addition to the target imidazolium carboxylate (5). Further, if more than 2 mol of the amine compound (8) is used per mol of the dicarbonyl compound (7), an excessive amount of the amine compound (8) will exist in addition to the target imidazolium carboxylate (5). The amidate compound (2) can also be obtained by using the imidazolium carboxylate (5) in which such compounds other than the imidazolium carboxylate coexist.

The ratio of the amine compound (8x) to the amine compound (8y) (amine compound (8x):amine compound (8y)) is not particularly limited, and is within the range of 0:100 to 100:0. When the ratio of the amine compound (8x) to the amine compound (8y) is 0:100 or 100:0, the group represented by $CR^4R^5R^6$ is the same as the group represented by $CR^9R^{10}R^{11}$. In cases other than the case where the group represented by $CR^4R^5R^6$ is the same as the group represented by $CR^9R^{10}R^{11}$, i.e., when the ratio of the amine compound (8x) to the amine compound (8y) is not 0:100 or 100:0, the compound represented by Formula (5) can be a mixture of compounds represented by the following Formulas (5-1), (5-2), and (5-3):

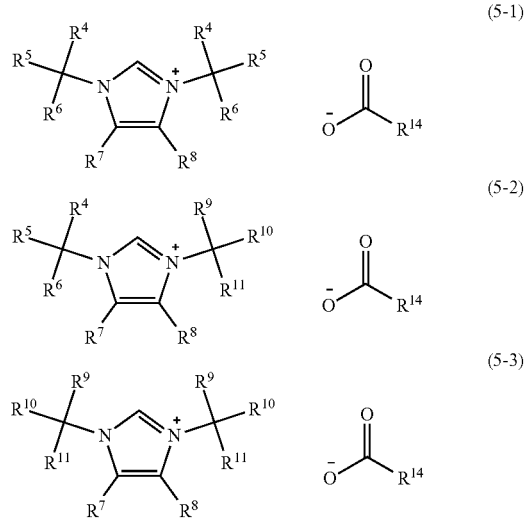

wherein in Formulas (5-1), (5-2), and (5-3), $R^4$, $R^5$, $R^6$, $R^7$, $R^8$, $R^9$, $R^{10}$, $R^{11}$, and $R^{14}$ are each as defined above, and the group represented by $CR^4R^5R^6$ or the group represented by $CR^9R^{10}R^{11}$ may be an adamantyl group.

The ratio of the compounds represented by formulas (5-1), (5-2), and (5-3) in the mixture varies depending on the ratio of the amine compound (8x) and amine compound (8y) used in the reaction. The compounds represented by formulas (5-1), (5-2), and (5-3) are all included in the imidazolium carboxylate (5).

As formaldehyde, an aqueous solution or an alcohol solution, such as methanol or butanol, may be used as it is. The amount of formaldehyde used is generally 0.1 to 10 mol, and preferably 0.5 to 5.0 mol, per mol of the dicarbonyl compound (7).

The amount of the carboxylic acid (9) used is generally 0.1 to 10 mol, preferably 0.5 to 2 mol, and more preferably 1 to 1.5 mol, per mol of the dicarbonyl compound (7).

The optimal reaction temperature varies depending on the raw materials, solvents, etc. used, but is generally −10° C. or higher, and preferably 0° C. to 100° C. The reaction time is generally 0.1 to 48 hours, and preferably 0.5 to 12 hours.

A solvent may or may not be used. When a solvent is used, the solvent used is not particularly limited, as long as it does not affect the reaction. Specific examples of solvents include aromatic hydrocarbons, such as toluene, benzene, and xylene; aliphatic or alicyclic hydrocarbons, such as methylcyclohexane, cyclohexane, hexane, heptane, and octane; halogenated hydrocarbons, such as dichloromethane, chloroform, carbon tetrachloride, and 1,2-dichloroethane; ethers, such as diethyl ether, tetrahydrofuran, and 1,4-dioxane; lower alcohols, such as methanol and ethanol; N,N-dimethylformamide, acetonitrile, water, and the like. Preferred among these are aromatic hydrocarbons, lower alcohols, and water; and particularly preferred are toluene and water. The solvents can be used as a mixture of two or more, if necessary.

The amount of solvent used is generally 50 parts by mass or less, and preferably 0.1 to 10 parts by mass, per part by mass of the dicarbonyl compound (7).

The reaction may be performed, if necessary, in an inert gas atmosphere, such as nitrogen, argon, or helium, which do not affect the reaction.

After completion of the reaction, the imidazolium carboxylate (5) can be isolated, for example, by removing impurities (e.g., unreacted raw materials) by washing with an organic solvent, or concentrating the reaction liquid, and may be purified by recrystallization, etc., if necessary.

The ester carbonate (6) is explained.

In Formula (6), $R^{15}$ and $R^{16}$ are the same or different, and each represents a $C_1$-$C_6$ hydrocarbon group, preferably a $C_1$-$C_4$ hydrocarbon group, and particularly preferably a methyl group. $R^{15}$ and $R^{16}$ may form a ring structure together with the oxygen atoms to which they are bonded. Examples of $C_1$-$C_6$ hydrocarbon groups include methyl, ethyl, propyl, isopropyl, butyl, sec-butyl, tert-butyl, pentyl, hexyl, and phenyl groups. Specific examples of the ester carbonate (6) include dialkyl carbonates, such as dimethyl carbonate, diethyl carbonate, dipropyl carbonate, dibutyl carbonate, dipentyl carbonate, and dihexyl carbonate; and alkylene carbonates, such as ethylene carbonate, propylene carbonate, and butylene carbonate. Preferred among these are dimethyl carbonate, diethyl carbonate, dipropyl carbonate, and dibutyl carbonate; and particularly preferred is dimethyl carbonate.

The amount of the ester carbonate (6) used is generally 1 mol or more, and preferably 1 to 6 mol, per mol of the imidazolium carboxylate (5). When the imidazolium carboxylate (5) contains excess carboxylic acid and water, they react with the ester carbonate (6); thus, it is preferable to use the ester carbonate (6) generally in excess of 1 mol or more, and preferably 1 to 6 mol, per mol of the total of the excess carboxylic acid and water in the imidazolium carboxylate (5).

In Reaction 1, a solvent may or may not be used. When a solvent is used, the solvent used is not particularly limited, as long as it does not affect the reaction. Specific examples of solvents include monovalent alcohol solvents, such as methanol, ethanol, propanol, butanol, pentanol, hexanol, 1-methoxy-2-propanol, and ethoxyethanol; polyol solvents, such as ethylene glycol, propylene glycol, and diethylene glycol; glycol monoalkyl ether solvents, such as dipropylene glycol monobutyl ether, dipropylene glycol monomethyl ether, and tripropylene glycol monomethyl ether; aromatic hydrocarbon solvents, such as toluene, benzene, and xylene; aliphatic hydrocarbon solvents, such as methylcyclohexane, cyclohexane, hexane, heptane, and octane; ester solvents, such as ethyl acetate and butyl acetate; ketone solvents, such as methyl ethyl ketone and 4-methyl-2-pentanone; and the like. Preferred among these are monovalent alcohol solvents, and particularly preferred is methanol. The amount of solvent used is generally 50 parts by mass or less, and preferably 10 parts by mass or less, per part by mass of the imidazolium carboxylate (5).

In Reaction 1, the optimal reaction temperature can vary depending on the raw materials, solvents, etc., used, and is generally room temperature or higher, and preferably 20 to 200° C. In the present specification, room temperature generally means about 20° C. The reaction time is generally 0.1 to 48 hours, and preferably 1 to 24 hours.

In Reaction 1, the reaction may be performed, if necessary, in an inert gas atmosphere, such as nitrogen, argon, or helium, which do not affect the reaction.

After completion of the reaction, the reaction liquid may be concentrated to remove the solvent, if necessary. When the ester carbonate (6) and the solvent remain in the reaction liquid, the reaction liquid can be concentrated to remove the ester carbonate (6) and the solvent.

Reaction 2 is explained.

The reaction product obtained in Reaction 1 (hereinafter also referred to as the reaction product (R)) is reacted with an isocyanate compound represented by Formula (10) to produce the amidate compound (2).

The isocyanate compound represented by Formula (10) (hereinafter referred to as the isocyanate compound (10)) is explained.

wherein B and y are each as defined above.

In the present invention, the isocyanate compound (10) is preferably a compound represented by any of the following Formulas (10-1), (10-2), and (10-3).

Formula (10-1):

wherein $R^{12}$ is as defined above.

Formula (10-2):

wherein $R^{13}$ is as defined above.

Formula (10-3):

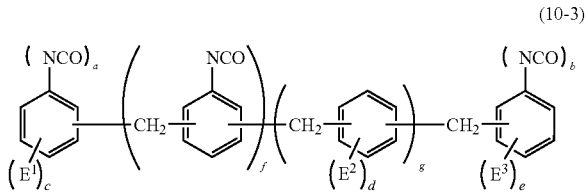

wherein $E^1$, $E^2$, $E^3$, a, b, c, d, e, f, and g are each as defined above.

In the present invention, a polymer such as polymethylene polyphenyl polyisocyanate (polymeric MDI) can also be used as the isocyanate compound (10).

Specific examples of the isocyanate compound (10) are shown below. However, the present invention is not limited thereto. In the following specific examples, Me represents a methyl group, iPr represents an isopropyl group, Bu represents an n-butyl group, Oct represents an n-octyl group, and MeO represents a methoxy group.

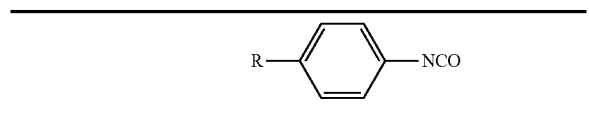

| R | |
|---|---|
| Me | (10-1-1) |
| iPr | (10-1-2) |
| Bu | (10-1-3) |
| Oct | (10-1-4) |
| MeO | (10-1-5) |
| Cl | (10-1-6) |

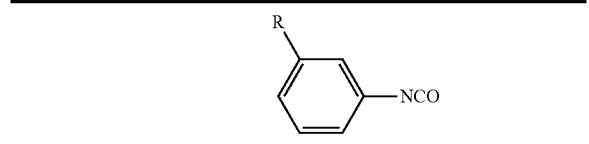

| R | |
|---|---|
| Me | (10-1-7) |
| iPr | (10-1-8) |
| Bu | (10-1-9) |
| Oct | (10-1-10) |
| MeO | (10-1-11) |
| Cl | (10-1-12) |

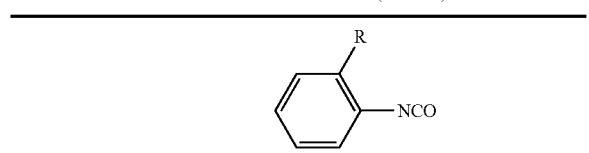

| R | |
|---|---|
| Me | (10-1-13) |
| iPr | (10-1-14) |
| Bu | (10-1-15) |
| Oct | (10-1-16) |
| MeO | (10-1-17) |
| Cl | (10-1-18) |

(10-1-19)

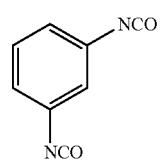
(10-2-1)

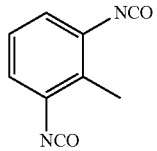
(10-2-2)

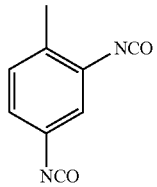
(10-2-3)

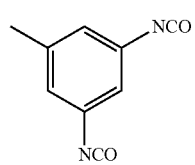
(10-2-4)

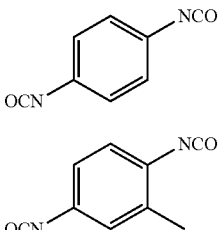
(10-2-5)

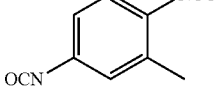
(10-2-6)

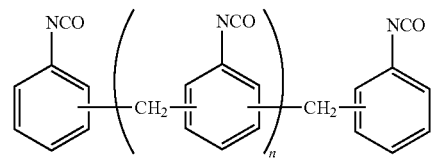
(10-3-1)

wherein n is as defined above.

The isocyanate compound (10) is preferably a compound represented by Formula (10-1-5), (10-1-19), (10-2-3), or (10-3-1), and more preferably a compound represented by Formula (10-1-19) or (10-3-1).

The isocyanate compounds (10) may be used singly or as a mixture of two or more.

In Reaction 2, the amount of the isocyanate compound (10) used is generally such that the amount of isocyanate groups in the isocyanate compound (10) is 0.8 mol or more, and preferably 1 to 3 mol, per mol of the imidazolium carboxylate (5).

The reaction temperature is not particularly limited, but is generally −10° C. or higher, preferably 0 to 200° C., and more preferably 20 to 150° C. The reaction time is generally 0.1 to 48 hours, and preferably 0.5 to 24 hours.

When a solvent is used, examples of solvents include aromatic hydrocarbon solvents, such as toluene, benzene, and xylene; aliphatic hydrocarbon solvents, such as methylcyclohexane, cyclohexane, hexane, heptane, and octane; halogenated hydrocarbon solvents, such as butyl chloride and 1,2-dichloroethane; halogenated aromatic hydrocarbon solvents, such as chlorobenzene; ester solvents, such as ethyl acetate and butyl acetate; ketone solvents, such as methyl ethyl ketone and 4-methyl-2-pentanone; and the like. Preferred among these are aromatic hydrocarbon solvents, halogenated aromatic hydrocarbon solvents, ester solvents, and ketone solvents; and particularly preferred are toluene, xylene, chlorobenzene, butyl acetate, and 4-methyl-2-pentanone. The solvents can be used as a mixture of two or more, if necessary. When the reaction product (R) contains the solvent used in Reaction 1, this solvent can also be used in Reaction 2 as a solvent; however, a solvent mentioned above may be further added. In this case, a solvent different from that of Reaction 1 may be used.

The amount of solvent used is generally 50 parts by mass or less, and preferably 0.1 parts by mass or more and 35 parts by mass or less, per part by mass of the imidazolium carboxylate (5).

The reaction may be performed, if necessary, in an inert gas atmosphere, such as nitrogen, argon, or helium, which do not affect the reaction.

After completion of the reaction, the amidate compound (2) can be obtained by removing the solvent by concentrating or filtering the reaction liquid, and may be purified by recrystallization, column separation, etc., if necessary.

In the present invention, the amidate compound (2) preferably functions as a blocking agent dissociation catalyst for blocked polyisocyanates. For example, when this compound is used as a blocking agent dissociation catalyst for blocked polyisocyanate compounds blocked with oxime-based compounds, such as methyl ethyl ketoxime, it has an excellent effect of dissociating the oxime, such as methyl ethyl ketoxime, to form a polyisocyanate, and promoting the reaction with a compound having an isocyanate-reactive group, described later.

In the blocked polyisocyanate composition of the present invention, the mixing ratio of the blocked polyisocyanate compound and the amidate compound (2) is determined by the required physical properties, and is not particularly limited. The mixing ratio is generally within the following range: amidate groups (mol) in the amidate compound (2)/[effective isocyanate groups (mol) in the blocked polyisocyanate compound]=0.001 to 0.5, and preferably 0.01 to 0.1. The amidate groups in the amidate compound (2) refer to functional groups represented by the following Formula (A), and the effective isocyanate groups in the blocked polyisocyanate compound refer to isocyanate groups that are regenerated when the blocking agent is dissociated from the blocked polyisocyanate compound.

Formula (A):

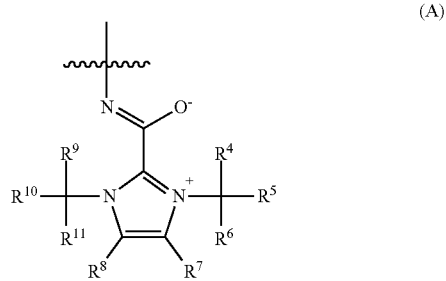

wherein $R^4$ to $R^{11}$ are each as defined above, and $CR^4R^5R^6$ or $CR^9R^{10}R^{11}$ may be an adamantyl group.

In the blocked polyisocyanate composition of the present invention, known catalysts for polyurethane production, additives, pigments, solvents, and the like that are commonly used in this technical field can be used, if necessary.

Known catalysts for polyurethane production are not particularly limited. Examples include tin compounds, such as dibutyltin dilaurate, dibutyltin di-2-ethylhexanate, dioctyltin dilaurate, dibutyltin diacetate, dibutyltin dioxide, dioctyltin dioxide, tin acetylacetonate, tin acetate, tin octylate, and tin laurate; bismuth compounds, such as bismuth octylate, bismuth naphthenate, and bismuth acetylacetonate; titanium compounds, such as tetra-n-butyl titanate, tetraisopropyl titanate, and titanium terephthalate; tertiary amine compounds, such as triethylamine, N,N,N',N'-tetramethylethylenediamine, N,N,N',N'-tetramethylpropylenediamine, N,N,N',N'',N''-pentamethyldiethylenetriamine, N,N,N',N'', N''-pentamethyldipropylenetriamine, N,N,N',N'-tetramethylguanidine, 1,3,5-tris(N,N-dimethylaminopropyl)hexahydro-S-triazine, 1,4-diazabicyclo[2.2.2]octane (DABCO), 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole, and 1-dimethylaminopropylimidazole; and quaternary ammonium salt compounds, such as tetraalkylanmonium halides (e.g., tetramethylammonium chloride), tetraalkylammonium hydroxides (e.g., tetramethylammonium hydroxide salts), tetraalkylammonium organic acid salts (e.g., tetramethylammonium-2-ethylhexanoate, 2-hydroxypropyl trimethylammonium formate, and 2-hydroxypropyl trimethylammonium-2-ethylhexanoate).

Additives are not particularly limited. Examples include hindered amine-based, benzotriazole-based, and benzophenone-based UV absorbers; perchlorate-based and hydroxylamine-based coloration inhibitors; hindered phenol-based, phosphorus-based, sulfur-based, and hydrazide-based antioxidants; tin-based, zinc-based, and amine-based urethanization catalysts; leveling agents, rheology control agents, pigment dispersants, and the like.

Pigments are not particularly limited. Examples include organic pigments, such as quinacridone-based, azo-based, and phthalocyamine-based pigments; inorganic pigments, such as titanium oxide, barium sulfate, calcium carbonate, and silica; and other pigments, such as carbon-based pigments, metal foil pigments, and rust-preventive pigments.

Solvents are not particularly limited. Examples include hydrocarbons, such as benzene, toluene, xylene, cyclohexane, mineral spirit, and naphtha; ketones, such as acetone, methyl ethyl ketone, and methyl isobutyl ketone; esters, such as ethyl acetate, butyl acetate, and cellosolve acetate; alcohols, such as methanol, ethanol, 2-propanol, butanol, 2-methoxyethanol, 2-ethoxyethanol, and 2-butoxyethanol; polyhydric alcohols, such as ethylene glycol, propylene glycol, diethylene glycol, polyethylene glycol, and glycerol; water; and the like. These solvents may be used singly or in combination of two or more.

The thermosetting resin composition of the present invention is explained.

The thermosetting resin composition of the present invention comprises the blocked polyisocyanate composition of the present invention and a compound having an isocyanate-reactive group.

Examples of the compound having an isocyanate-reactive group include compounds having two or more active hydrogen groups, such as polyols, polyamines, and alkanolamines. These compounds having an isocyanate-reactive group may be a mixture of two or more.

In the present invention, polyols are compounds having two or more hydroxyl groups. Examples include polyester polyols, polyether polyols, acrylic polyols, polyolefin polyols, fluorine polyols, and the like. Preferred polyols among these are acrylic polyols in terms of weather resistance, chemical resistance, and hardness. Alternatively, polyols preferred in terms of mechanical strength and oil resistance are polyester polyols. These polyols may be a mixture of two or more.

Examples of polyether polyols include active hydrogen compounds, such as aliphatic amine polyols, aromatic amine polyols, Mannich polyols, polyhydric alcohols, polyhydric phenols, and bisphenols; compounds obtained by adding alkylene oxides to these active hydrogen compounds; and the like. These polyether polyols may be a mixture of two or more.

Examples of aliphatic amine polyols include alkylenediamine-based polyols and alkanolamine-based polyols. These polyol compounds are polyfunctional polyol compounds having terminal hydroxyl groups obtained by the ring-opening addition of at least one cyclic ether, such as ethylene oxide or propylene oxide, using alkylenediamine or alkanolamine as an initiator. As the alkylenediamine, known compounds can be used without limitation. Specifically, $C_{2-8}$ alkylenediamines, such as ethylenediamine, propylenediamine, butylenediamine, hexamethylenediamine, and neopentyldiamine, are preferably used. These aliphatic amine polyols may be a mixture of two or more.

Aromatic amine polyols are polyfunctional polyether polyol compounds having terminal hydroxyl groups obtained by the ring-opening addition of at least one cyclic ether, such as ethylene oxide or propylene oxide, using an aromatic diamine as an initiator. As the initiator, a known aromatic diamine can be used without limitation. Specific examples include 2,4-toluenediamine, 2,6-toluenediamine, diethyltoluenediamine, 4,4'-diaminodiphenylmethane, p-phenylenediamine, o-phenylenediamine, naphthalenediamine, and the like. Among these, toluenediamine (2,4-toluenediamine, 2,6-toluenediamine, or a mixture thereof) is particularly preferably used. These aromatic amine polyols may be a mixture of two or more.

Mannich polyols are active hydrogen compounds obtained by the Mannich reaction of phenol and/or an alkyl-substituted derivative thereof, formaldehyde, and alkanolamine, or polyol compounds obtained by the ring-opening addition polymerization of the active hydrogen compounds with at least one of ethylene oxide and propylene oxide. These Mannich polyols may be a mixture of two or more.

Examples of polyhydric alcohols include dihydric alcohols (e.g., ethylene glycol, propylene glycol, 1,4-butanediol, 1,6-hexanediol, diethylene glycol, triethylene glycol, dipropylene glycol, and neopentyl glycol), trihydric or higher alcohols (e.g., glycerol, trimethylolpropane, pentaerythritol, methylglucoside, sorbitol, and sucrose), and the like. These polyhydric alcohols may be a mixture of two or more.

Examples of polyhydric phenols include pyrogallol, hydroquinone, and the like. These polyhydric phenols may be a mixture of two or more.

Examples of bisphenols include bisphenol A, bisphenol S, bisphenol F, low-condensates of phenols and formaldehyde, and the like. These bisphenols may be a mixture of two or more.

Polyester polyols can be obtained, for example, by the condensation reaction of a single dibasic acid or a mixture of two or more dibasic acids with a single polyhydric alcohol or a mixture of two or more polyhydric alcohols.

Examples of dibasic acids include carboxylic acids, such as succinic acid, adipic acid, dimer acid, maleic anhydride, phthalic anhydride, isophthalic acid, terephthalic acid, and 1,4-cyclohexanedicarboxylic acid; and the like.

Examples of polyhydric alcohols include ethylene glycol, propylene glycol, diethylene glycol, 1,4-butanediol, neopentyl glycol, 1,6-hexanediol, trimethylpentanediol, cyclohexanediol, trimethylolpropane, glycerol, pentaerythritol, 2-methylolpropanediol, ethoxylated trimethylolpropane, and the like.

As a specific method for producing polyester polyols, for example, the condensation reaction can be carried out by mixing the above components, and heating the mixture at about 160 to 220° C. Alternatively, for example, polycaprolactones obtained by the ring-opening polymerization of lactones, such as ε-caprolactone, with polyhydric alcohols can also be used as polyester polyols.

These polyester polyols can be modified by using, for example, aromatic diisocyanates, aliphatic diisocyanates, alicyclic diisocyanates, and polyisocyanates obtained from them. Among these, in terms of weather resistance, yellowing resistance, etc., polyester polyols are preferably modified by using aliphatic diisocyanates, alicyclic diisocyanates, and polyisocyanates obtained from them.

When the thermosetting resin composition of the present embodiment is used as an aqueous-based paint, some carboxylic acids derived from the dibasic acid etc. in the polyester polyol can be allowed to remain and neutralized with a base, such as amine or ammonia, thereby forming the polyester polyol into a water-soluble or water-dispersible resin.

Polyether polyols can be obtained, for example, by any of the following methods (1) to (3).

(1) A method of performing random or block addition of an alkylene oxide alone or a mixture of alkylene oxides to a polyhydroxy compound alone or a mixture of polyhydroxy compounds using a catalyst to obtain polyether polyols.

Examples of catalysts include hydroxides (of lithium, sodium, potassium, etc.), strong base catalysts (alcoholates, alkylamines, etc.), composite metal cyanide compound complexes (metal porphyrins, zinc hexacyanocobaltate complexes, etc.), and the like.

Examples of alkylene oxides include ethylene oxide, propylene oxide, butylene oxide, cyclohexene oxide, styrene oxide, and the like.

(2) A method of reacting polyamine compounds with alkylene oxides to obtain polyethers polyols.

Examples of polyamine compounds include ethylene diamines and the like.

Examples of alkylene oxides include those mentioned in (1).

(3) A method of polymerizing acrylamide etc. using the polyether polyols obtained in (1) or (2) as media to obtain so-called polymer polyols.

Examples of polyhydroxy compounds include the following (i) to (vi).

(i) diglycol, ditrimethylolpropane, pentaerythritol, dipentaerythritol, etc.

(ii) sugar alcohol-based compounds, such as erythritol, D-threitol, L-arabinitol, ribitol, xylitol, sorbitol, mannitol, galactitol, and rhamnitol (iii) monosaccharides, such as arabinose, ribose, xylose, glucose, mannose, galactose, fructose, sorbose, rhamnose, fucose, and ribodesose (iv) disaccharides, such as trehalose, sucrose, maltose, cellobiose, gentiobiose, lactose, and melibiose (v) trisaccharides, such as raffinose, gentianose, and melezitose
(vi) tetrasaccharides, such as stachyose Acrylic polyols can be obtained, for example, by polymerizing polymerizable monomers having one or more active hydrogens per molecule, or by copolymerizing polymerizable monomers having one or more active hydrogens per molecule with other monomers copolymerizable with the polymerizable monomers, if necessary.

Examples of polymerizable monomers having one or more active hydrogens per molecule include the following (i) to (vi). These may be used singly or in combination of two or more.
- (i) acrylic acid esters having active hydrogen, such as 2-hydroxyethyl acrylate, 2-hydroxypropyl acrylate, and 2-hydroxybutyl acrylate
- (ii) methacrylic acid esters having active hydrogen, such as 2-hydroxyethyl methacrylate, 2-hydroxypropyl methacrylate, 2-hydroxybutyl methacrylate, 3-hydroxypropyl methacrylate, and 4-hydroxybutyl methacrylate
- (iii) (meth)acrylic acid esters having polyvalent active hydrogen, such as (meth)acrylic acid monoesters of triols, such as glycerol and trimethylolpropane
- (iv) monoethers of polyether polyols (e.g., polyethylene glycol, polypropylene glycol, and polybutylene glycol) with the above (meth)acrylic acid esters having active hydrogen
- (v) adducts of glycidyl (meth)acrylate with monobasic acids (e.g., acetic acid, propionic acid, and p-tert-butyl benzoic acid)
- (vi) adducts obtained by the ring-opening polymerization of lactones (e.g., ε-caprolactam and γ-valerolactone) with the active hydrogen of the above (meta)acrylic acid esters having active hydrogen Examples of monomers copolymerizable with the above polymerizable monomers include the following (i) to (iv). These may be used singly or in combination of two or more.
- (i) (meth)acrylic acid esters, such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate
- (ii) unsaturated carboxylic acids, such as acrylic acid, methacrylic acid, maleic acid, and itaconic acid; and unsaturated amides, such as acrylamide, N-methylolacrylanide, and diacetoneacrylamide
- (iii) vinyl monomers having a hydrolyzable silyl group, such as vinyl trimethoxysilane, vinyl methyl dimethoxysilane, and γ-(meth)acrylopropyltrimethoxysilane
- (iv) other polymerizable monomers, such as styrene, vinyl toluene, vinyl acetate, acrylonitrile, and dibutyl fumarate As a specific method for producing acrylic polyols, for example, the above monomer components are subjected to solution polymerization in the presence of a known radical polymerization initiator, such as a peroxide or an azo compound, optionally followed by dilution with an organic solvent etc., thereby obtaining acrylic polyols.

When the thermosetting resin composition of the present embodiment is used as an aqueous-based paint, aqueous-based acrylic polyols can be produced by solution polymerization of the above monomer components, and conversion to an aqueous layer, or by using a known method, such as emulsion polymerization. In that case, the acidic portions of carboxylic acid-containing monomers and sulfonic acid-containing monomers, such as acrylic acid and methacrylic acid, can be neutralized with amine or ammonia to make acrylic polyols water-soluble or water-dispersible.

Examples of polyolefin polyols include polybutadiene having two or more hydroxyl groups, hydrogenated polybutadiene having two or more hydroxyl groups, hydrogenated polyisoprene having two or more hydroxyl groups, and the like.

In the polyolefin polyol, the number of hydroxyl groups is preferably three because higher coating film strength can be obtained.

In the present specification, "fluorine polyols" refer to polyols containing fluorine in the molecule. Specific examples of fluorine polyols include the copolymers of fluoroolefin, cyclovinyl ether, hydroxyalkyl vinyl ether, and vinyl monocarboxylate disclosed in JPS57-34107A, JPS61-275311A, etc.

The lower limit of the hydroxyl value of the polyol is preferably 10 mgKOH/g or more, more preferably 20 mgKOH/g or more, and even more preferably 30 mgKOH/g or more.

On the other hand, the upper limit of the hydroxyl value of the polyol is not particularly limited, and may be, for example, 200 mgKOH/g or less.

Specifically, the hydroxyl value of the polyol is preferably 10 mgKOH/g or more and 200 mgKOH/g or less, more preferably 20 mgKOH/g or more and 200 mgKOH/g or less, and even more preferably 30 mgKOH/g or more and 200 mgKOH/g or less.

Further, the acid value of the polyol is preferably 0 mgKOH/g or more and 30 mgKOH/g or less.

The hydroxyl value and acid value can be measured according to JIS K1557.

The molar equivalent ratio (NCO/OH) of isocyanate groups in the blocked polyisocyanate composition to hydroxyl groups in the polyol is preferably 0.2 or more and 5.0 or less, more preferably 0.4 or more and 3.0 or less, and even more preferably 0.5 or more and 2.0 or less.

Usable polyamines are those having two or more primary amino groups or secondary amino groups per molecule. Preferred among these are those having three or more such amino groups per molecule.

Specific examples of polyamines include diamines, such as ethylenediamine, propylenediamine, butylenediamine, triethylenediamine, hexamethylenediamine, 4,4'-diaminodicyclohexylmethane, piperazine, 2-methylpiperazine, and isophoronediamine; chain polyamines having three or more amino groups, such as bishexamethylenetriamine, diethylenetriamine, triethylenetetramine, tetraethylenepentamine, pentamethylenehexamine, and tetrapropylenepentamine; and cyclic polyamines, such as 1,4,7,10,13,16-hexaazacyclooctadecane, 1,4,7,10-tetraazacyclodecane, 1,4,8,12-tetraazacyclopentadecane, and 1,4,8,11-tetraazacyclotetradecane.

Alkanolamines refer to compounds having an amino group and a hydroxyl group per molecule. Examples of alkanolamines include monoethanolamine, diethanolamine, aminoethylethanolamine, N-(2-hydroxypropyl)ethylenediamine, mono-, di-(n- or iso-)propanolamine, ethylene glycol-bis-propylamine, neopentanolamine, methylethanolamine, and the like.

The thermosetting resin composition of the present embodiment may contain, if necessary, melamine-based curing agents, such as complete alkyl type, methylol type, and alkylamino group type alkyl.

The thermosetting resin composition of the present embodiment may contain an organic solvent.

Further, the compound having an isocyanate-reactive group and the blocked polyisocyanate composition described above may contain an organic solvent.

Preferable organic solvents are those that are compatible with the blocked polyisocyanate composition.

Specific examples of organic solvents include hydrocarbons, such as benzene, toluene, xylene, cyclohexane, mineral spirit, and naphtha; ketones, such as acetone, methyl ethyl ketone, and methyl isobutyl ketone; esters, such as ethyl acetate, butyl acetate, and cellosolve acetate; alcohols, such as methanol, ethanol, 2-propanol, butanol, 2-methoxyethanol, 2-ethoxyethanol, and 2-butoxyethanol; polyhydric alcohols, such as ethylene glycol, propylene glycol, diethylene glycol, polyethylene glycol, and glycerol; water; and the like. These solvents may be used singly or in combination of two or more.

Further, the thermosetting resin composition of the present embodiment can be used as an aqueous thermosetting resin composition dissolved or dispersed in water. When the thermosetting resin composition of the present invention is used as an aqueous thermosetting resin composition, in order to improve the compatibility of the thermosetting resin composition, surfactants, solvents that tend to be miscible with water, etc. may be used for the blocked polyisocyanate composition of the present invention. Examples of surfactants include anionic surfactants, such as aliphatic soaps, rosin acid soaps, alkyl sulfonates, dialkylaryl sulfonates, alkyl sulfosuccinates, polyoxyethylene alkyl sulfates, and polyoxyethylene alkylaryl sulfates; and nonionic surfactants, such as polyoxyethylene alkyl ethers, polyoxyethylene alkyl aryl ethers, and polyoxyethylene oxypropylene block copolymers. Examples of solvents that tend to be miscible with water include diethylene glycol dimethyl ether, diethylene glycol diethyl ether, propylene glycol monomethyl ether acetate, propylene glycol monomethyl ether, propylene glycol dimethyl ether, dipropylene glycol dimethyl ether, isobutanol, butyl glycol, N-methylpyrrolidone, butyl diglycol, butyl diglycol acetate, and the like.

Preferred among the above solvents are diethylene glycol dimethyl ether, diethylene glycol diethyl ether, propylene glycol monomethyl ether, propylene glycol dimethyl ether, dipropylene glycol dimethyl ether, isobutanol, butyl glycol, N-methylpyrrolidone, and butyl diglycol; and more preferred are diethylene glycol dimethyl ether, diethylene glycol diethyl ether, propylene glycol dimethyl ether, and dipropylene glycol dimethyl ether. These solvents may be used singly or in combination of two or more. Ester solvents, such as ethyl acetate, n-butyl acetate, and cellosolve acetate, are not preferred because the solvents themselves may hydrolyze during storage.

In the thermosetting resin composition of the present invention, the mixing ratio of the blocked polyisocyanate composition and the compound having an isocyanate-reactive group is determined by the required physical properties, and is not particularly limited. The mixing ratio is generally within the following range: [the amount of effective isocyanate groups (mol) in the blocked polyisocyanate compound in the blocked polyisocyanate composition]/[the amount of active hydrogen groups (mol) in the compound having an isocyanate-reactive group]=0.2 to 5, and preferably 0.5 to 3. The effective isocyanate groups in the blocked polyisocyanate compound refer to isocyanate groups that are regenerated when the blocking agent is dissociated from the blocked polyisocyanate compound.

In the thermosetting resin composition of the present invention, known catalysts for polyurethane production, additives, pigments, and the like that are commonly used in this technical field can be used, if necessary. These may be used as a mixture with known blocked polyisocyanates.

Known catalysts for polyurethane production are not particularly limited. Examples include tin compounds, such as dibutyltin dilaurate, dibutyltin di-2-ethylhexanate, dioctyltin dilaurate, dibutyltin diacetate, dibutyltin dioxide, dioctyltin dioxide, tin acetylacetonate, tin acetate, tin octylate, and tin laurate; bismuth compounds, such as bismuth octylate, bismuth naphthenate, and bismuth acetylacetonate; titanium compounds, such as tetra-n-butyl titanate, tetraisopropyl titanate, and titanium terephthalate; tertiary amine compounds, such as triethylamine, N,N,N',N'-tetramethylethylenediamine, N,N,N',N'-tetramethylpropylenediamine, N,N,N',N",N"-pentamethyldiethylenetriamine, N,N,N',N", N"-pentamethyldipropylenetriamine, N,N,N',N'-tetramethylguanidine, 1,3,5-tris(N,N-dimethylaminopropyl)hexahydro-S-triazine, 1,4-diazabicyclo[2.2.2]octane (DABCO), 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole, and 1-dimethylaminopropylimidazole; and quaternary ammonium salt compounds, such as tetraalkylanmonium halides (e.g., tetramethylammonium chloride), tetraalkylammonium hydroxides (e.g., tetramethylammonium hydroxide salts), tetraalkylammonium organic acid salts (e.g., tetramethylammonium-2-ethylhexanoate, 2-hydroxypropyl trimethylammonium formate, and 2-hydroxypropyl trimethylammonium-2-ethylhexanoate).

Additives are not particularly limited. Examples include hindered amine-based, benzotriazole-based, and benzophenone-based UV absorbers; perchlorate-based and hydroxylamine-based coloration inhibitors; hindered phenol-based, phosphorus-based, sulfur-based, and hydrazide-based antioxidants; tin-based, zinc-based, and amine-based urethanization catalysts; leveling agents, antifoaming agents, rheology control agents, thixotropy-imparting agents, thickeners, light stabilizers, plasticizers, surfactants, coupling agents, flame retardants, rust inhibitors, fluorescent whitening agents, pigment dispersants, and the like that are commonly used in this technical field.

Pigments are not particularly limited. Examples include organic pigments, such as quinacridone-based, azo-based, and phthalocyamine-based pigments; inorganic pigments, such as titanium oxide, barium sulfate, calcium carbonate, and silica; and other pigments, such as carbon-based pigments, metal foil pigments, and rust-preventive pigments.

Examples of known blocked polyisocyanates include blocked polyisocyanates obtained by reacting polyisocyanates and known blocking agents. Examples of known blocking agents include phenol-based compounds, such as phenol, thiophenol, methylthiophenol, xylenol, cresol, resorcinol, nitrophenol, and chlorophenol; oxime-based compounds, such as acetone oxime, methyl ethyl ketone oxime, and cyclohexanone oxime; alcohol-based compounds, such as methanol, ethanol, n-propyl alcohol, isopropyl alcohol, n-butyl alcohol, isobutyl alcohol, t-butyl alcohol, t-pentanol, ethylene glycol monoethyl ether, ethylene glycol monobutyl ether, diethylene glycol monoethyl ether, propylene glycol monomethyl ether, and benzyl alcohol; pyrazole-based compounds, such as 3,5-dimethyl pyrazole and 1,2-pyrazole; triazole-based compounds, such as 1,2,4-triazole; halogen-substituted alcohol-based compounds, such as ethylene chlorohydrin and 1,3-dichloro-2-propanol; lactam-based compounds, such as ε-caprolactam, δ-valerolactam, γ-butyrolactam, and β-propyllactam; active methylene-based compounds, such as methyl acetoacetate, ethyl acetoacetate, acetylacetone, methyl malonate, and ethyl malonate; and the like. Other examples include amine-based compounds, imide-based compounds, mercaptan-based compounds, imine-based compounds, urea-based compounds, diaryl-based compounds, and the like.

The thermosetting resin composition of the present invention can be used as paints for automobiles, for buildings, for metal products such as steel furniture, for wooden products such as musical instruments, for mechanical vehicles such as construction machinery, for building materials such as sashes, and for electrical appliances such as office equipment; coating materials for artificial leather, rubber rolls, etc.; inks, adhesives, pressure-sensitive adhesives, sealing materials for electronic components, sealing materials for automobiles, buildings, etc., molding materials for 3D printers, and the like.

Next, the method for curing the thermosetting resin composition of the present invention is explained.

In the method of the present invention, the thermosetting resin composition, which is a mixture of the blocked polyisocyanate composition and the compound having an isocyanate-reactive group described above, is heated.

The reaction temperature varies depending on the blocked polyisocyanate compound and the amidate compound (2) in the blocked polyisocyanate composition used, but is generally about 60 to 250° C., and preferably about 80 to 200° C. The reaction time is about 30 seconds to 5 hours, and preferably about 1 minute to 60 minutes.

The cured product of the present invention can be produced through the above method for curing the thermosetting resin composition of the present invention.

EXAMPLES

The present invention is described in more detail below with reference to Production Examples and Examples; however, the present invention is not limited to these Examples.
(1) Conditions of Infrared Spectroscopy
    Device: FT/IR-6600, produced by JASCO Corporation
    Measurement method: total reflection measurement method (crystal: germanium)
    Cumulative number: 16
(2) $^1$H-NMR Analysis Conditions
    Device: AV400 produced by Bruker Corporation
    Frequency: 400 MHz
(3) Measurement Conditions of Curing Temperature and Time
    Device: Madoka automatic curing time measuring device produced by Cyber Co., Ltd.
    Stirring rod: Model number 3JC-5060W
    Stirring rate: rotation 100 rpm, revolutions 25 rpm
(4) Calculation of Solids Content
    About 1.5 g of a sample was heated at 110° C. for 3 hours, and the solids content (%) in the sample was calculated from the mass before and after heating.
(5) Formulation of Thermosetting Resin Composition
    A blocked polyisocyanate compound, a compound having an isocyanate-reactive group, and an amidate compound were added such that effective NCO group (mol):hydroxyl group (mol):amidate group (mol)=1.00:0.95:0.05, and methyl isobutyl ketone was added such that solids content in the blocked polyisocyanate compound (g):solvent (g)=1.0:1.0. The solvent referred to here includes the solvent used for diluting the blocked polyisocyanate compound. The effective NCO group (mol) and hydroxyl group (mol) were calculated according to the following formula.

Effective NCO group (mol)=amount of the blocked polyisocyanate used (g)/effective NCO group content (%) in the blocked polyisocyanate/4.202

Hydroxyl group (mol)=amount of the polyol used (g)×hydroxyl value of the polyol(mgKOH/g)/56.1

Production Example B-1: Synthesis of MEKO-Blocked HDI Biuret 60.0 g (NCO group: 0.33 mol) of HDI biuret (Desmodur N3200A, NCO group content: 22.8(%), produced by Sumika Covestro Urethane Co., Ltd.), 36.9 g of methyl isobutyl ketone ("MIBK" below) were placed in a 200-mL three-necked reactor purged with nitrogen and heated to 65° C., followed by addition of 0.6 g of triethylamine ("TEA" below). Thereafter, 29.0 g (0.33 mol) of methyl ethyl ketoxime ("MEKO" below) and 22.9 g of MIBK were added dropwise to the reactor and stirred at 65° C. for 2 hours. Then, the disappearance of the infrared absorption peak of isocyanate group near 2270 cm-1 was confirmed by infrared spectroscopic analysis. The obtained reaction solution was concentrated under reduced pressure to remove TEA and most of MIBK, and 17.4 g of MIBK was added, thus obtaining 117.9 g of a MIBK solution of MEKO-blocked HDI biuret. The obtained MEKO-blocked HDI biuret had a solids content of 74.7%, and an effective NCO group content of 11.6%.

Production Example A-1: Synthesis of DOIm_PI

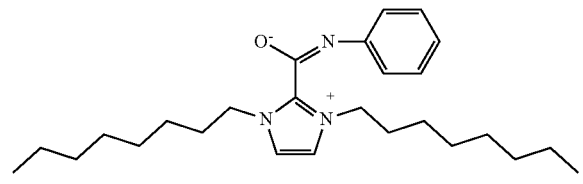

Step 1
1049.9 g (8.12 mol) of n-octylamine was placed in a 3-L four-necked reactor purged with nitrogen and heated to 80° C. Subsequently, a mixture of 366.0 g (6.09 mol) of acetic acid and 290.4 g of 42 wt % formalin aqueous solution (formaldehyde pure content: 4.06 mol) was added dropwise to the reactor over 1 hour. The solution after dropwise addition was stirred for 30 minutes and cooled to 40° C. To the solution cooled to 40° C., 581.0 g of 41 wt % glyoxal aqueous solution (glyoxal pure content: 4.06 mol) was added dropwise over 30 minutes and stirred for 5 hours. After stirring, the obtained reaction solution was concentrated under reduced pressure to give 1582.0 g of a reaction product containing 1,3-di-n-octylimidazolium acetate. The results of 1H-NMR analysis with tetralin added as an internal standard substance revealed that the pure content of 1,3-di-n-octylimidazolium acetate was 1224.9 g (3.47 mol, yield: 85.5%).
Step 2
1070.1 g (pure content: 828.6 g, 2.35 mol) of the reaction product obtained in step 1, 1069.5 g of toluene, and 756.0 g (8.39 mol) of dimethyl carbonate were placed in a 5-L pressure-resistant container, followed by purging with nitrogen. The mixture was then stirred at 120° C. for 15 hours. After stirring, the obtained reaction mixture was concentrated under reduced pressure to 1043.5 g, to which toluene was added to give 2058.6 g of a toluene solution.
Step 3

1700.2 g of the toluene solution obtained in step 2 and 807.4 g of toluene were placed in a 3-L four-necked reactor purged with nitrogen and heated under reflux. To the reaction liquid heated under reflux, 229.7 g (1.93 mol) of phenyl isocyanate was added dropwise over 2 hours and stirred for 10 hours. After stirring, the obtained reaction mixture was concentrated to 1433.1 g, and 761.0 g of heptane was added. The resulting mixture was heated to 50° C. to dissolve all of the solids to obtain a mixed solution. The obtained mixed solution was then cooled from 50° C. to 30° C. to precipitate crystals, followed by stirring at 30° C. for 1 hour. Subsequently, the mixed solution was cooled to 10° C. over a period of 2 hours at 10° C. per hour and stirred at 10° C. for another 1 hour to obtain a slurry liquid. The obtained slurry liquid was filtered to give 426.8 g (1.04 mol; overall yield from step 2: 53.2%) of a compound represented by the above formula (DOIm_PI) as a pale yellow solid. The 1H-NMR analysis results of DOIm_PI are shown below. $^1$H-NMR (DMSO-d6) δ (ppm)=9.32 (s, 1H), 7.80 (s, 2H), 4.17 (t, J=9.6 Hz, 4H), 1.78 (m, 4H), 1.63 (s, 3H), 1.23 (m, 20H), 0.85 (t, J=6.4 Hz, 6H)

Production Example A-2: Synthesis of DtBIm_PI

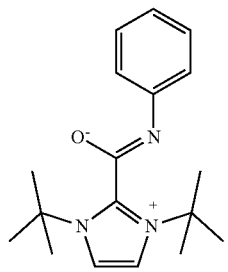

Step 1

100.0 g (1.36 mol) of tert-butylamine was placed in a 300-mL four-necked reactor purged with nitrogen and heated to 40° C. Subsequently, a mixture of 62.1 g (1.03 mol) of acetic acid and 50.8 g of 40 wt % formalin aqueous solution (formaldehyde pure content: 0.68 mol) was added dropwise to the reactor over 1 hour and stirred for 30 minutes. To the stirred solution, 99.0 g of 40 wt % glyoxal aqueous solution (glyoxal pure content: 0.68 mol) was added dropwise over 30 minutes and stirred for 5 hours. After stirring, the obtained reaction solution was concentrated under reduced pressure, and 100.0 g of H$_2$O and 100.0 g of toluene were added to carry out a liquid separation operation. The aqueous layer obtained after liquid separation was concentrated under reduced pressure to give 123.2 g of a reaction product containing 1,3-di-tert-butylimidazolium acetate.
Step 2

40.0 g of the reaction product containing 1,3-di-tert-butylimidazolium acetate obtained in step 1 and 52.6 g (0.58 mol) of dimethyl carbonate were placed in a 180-mL pressure-resistant container, followed by purging with nitrogen. The mixture was then stirred at 120° C. for 6 hours. After stirring, the obtained reaction mixture was concentrated under reduced pressure to give a black solid. The obtained black solid was washed with 100.0 g of acetone, thus obtaining 38.6 g of a white solid.
Step 3

10.0 g of the white solid obtained in step 2 and 40.0 g of chlorobenzene were placed in a 100-mL three-necked reactor purged with nitrogen and heated under reflux. After heating under reflux, a mixture of 5.9 g (0.043 mol) of phenyl isocyanate and 10.0 g of chlorobenzene was added dropwise to the reactor over 10 minutes and stirred for 1 hour. After stirring, the obtained reaction mixture was filtered, and the filter residue was washed with 50.0 g of heptane to give 7.84 g (0.017 mmol, overall yield from step 1: 30.0%) of a composition comprising a compound represented by the above formula (DtBIm_PI). The 1H-NMR analysis results of DtBIm_PI are shown below.
$^1$H-NMR (CDCl$_3$) δ (ppm)=7.56 (d, J=6.6 Hz, 2H), 7.31 (t, J=6.6 Hz, 2H), 7.07 (s, 2H) 6.93 (t, J=7.2 Hz, 1H), 1.87 (s, 18H)

Production Example A-3: Synthesis of DtOIm_PI

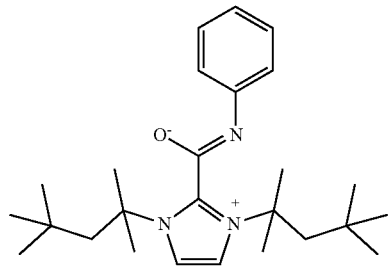

Step 1

6.97 g (0.116 mol) of acetic acid, 5.80 g of 40 wt % formalin aqueous solution (formaldehyde pure content: 0.077 mol), and 11.2 g of 40 wt % glyoxal aqueous solution (glyoxal pure content: 0.077 mol) were placed in a 100-ml three-necked reactor purged with nitrogen and heated to 50° C. Then, 20.00 g (0.154 mol) of 1,1,3,3-tetramethylbutylamine was added dropwise to the mixture in the reactor over 2 hours and stirred for 2 hours. After stirring, the obtained reaction solution was concentrated under reduced pressure to give 24.8 g of a reaction product containing 1,3-bis(1,1,3,3-tetramethylbutyl) imidazolium acetate.
Step 2

24.8 g of the reaction product containing 1,3-bis(1,1,3,3-tetramethylbutyl) imidazolium acetate obtained in step 1, 27.0 g (0.297 mol) of dimethyl carbonate, and 30.0 g of toluene were placed in a 180-mL pressure-resistant container, followed by purging with nitrogen. The mixture in the pressure-resistant container was then stirred at 120° C. for 6 hours. After stirring, the obtained reaction mixture was concentrated under reduced pressure to give 20.0 g of a dark brown solid.
Step 3

10.4 g of the dark brown solid obtained in step 2 and 40.0 g of chlorobenzene were placed in a 100-mL three-necked reactor purged with nitrogen and heated under reflux. After heating under reflux, the mixture was cooled to 60° C., and a mixture of 3.9 g (0.032 mol) of phenyl isocyanate and 12.2 g of chlorobenzene was added thereto dropwise over 10 minutes and stirred at 60° C. for 1 hour. After stirring, the obtained reaction mixture was cooled to room temperature, and 50.0 g of heptane was added. Then, the resulting mixture was filtered, and the filter residue was washed with 50.0 g of heptane to give 7.55 g (0.014 mmol, overall yield from step 1: 36.0%) of a composition comprising a compound represented by the above formula (DtOIm_PI). The 1H-NMR analysis results of DtOIm_PI are shown below.

$^1$H-NMR (CDCl$_3$) δ (ppm)=7.59 (d, J=9.2 Hz, 2H), 7.30 (t, J=7.6 Hz, 2H), 7.08 (s, 2H) 6.93 (t, J=7.2 Hz, 1H), 2.40 (m, 4H), 1.87 (m, 12H), 0.99 (s, 18H)

Production Example A-4: Synthesis of DtOIm_crMDI

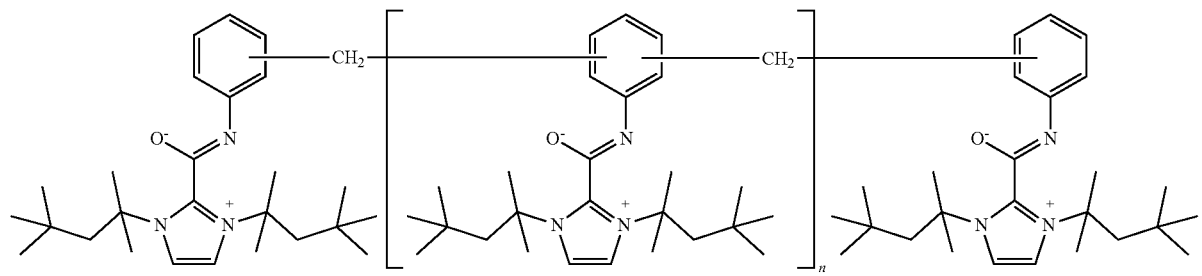

5.0 g of the dark brown solid obtained in step 2 of Production Example A-3 and 20.0 g of chlorobenzene were placed in a 100-mL three-necked reactor purged with nitrogen and heated under reflux. After heating under refluxing, a mixture of 1.52 g (NCO group: 0.012 mol) of polymeric MDI (Sumidur 44V20, solids content: 100%, NCO group content: 32.0%, produced by Sumika Covestro Urethane Co., Ltd.) and 5.0 g of chlorobenzene was added dropwise to the reactor over 10 minutes and stirred for 1 hour. After stirring, the obtained reaction mixture was added dropwise to 50.0 g of heptane and filtered, and the filter residue was washed with 50.0 g of heptane to give 4.28 g (0.014 mmol, overall yield from step 1: 52.0%) of a composition comprising a compound represented by the above formula (DtOIm_crMDI). The 1H-NMR analysis results of DtOc-tIm_crMDI are shown below.

$^1$H-NMR (CDCl$_3$) δ (ppm)=7.52-7.48 (m), 7.35-7.30 (m), 7.13-7.11 (m) 7.04-7.00 (m), 1.87 (m), 1.32 (m), 0.93 (m)

Production Example A-5: Synthesis of OMIm PI

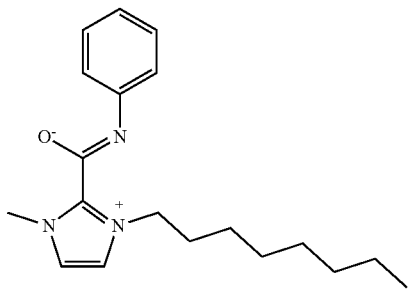

Step 1

25.0 g (139 mmol) of 1-octylimidazole, 16.7 g (185 mmol) of dimethyl carbonate, and 25.1 g of methanol were placed in a 180-mL autoclave purged with nitrogen and stirred at 125° C. for 29 hours. After stirring, the reaction mixture was cooled to room temperature. To the cooled reaction mixture was added 8.5 g (94 mmol) of dimethyl carbonate, and the mixture was stirred at 130° C. for another 3 hours. The obtained reaction mixture was cooled to 25° C. to give 44.0 g of a methanol solution of 1-octyl-3-methyl-imidazolium-2-carboxylate (abbreviated below as "OMIm-CO$_2$") (pure content: 33.0 g, 139 mmol, yield: 99%).

Step 2

4.0 g (pure content: 13 mmol) of the methanol solution of OMIm-CO$_2$ obtained in step 1, 1.5 g (13 mmol) of phenyl isocyanate, and 100 mL of toluene were placed in a 200-mL test tube purged with nitrogen, and the obtained mixture was stirred at an internal temperature of 110° C. for 3 hours.

After concentration under reduced pressure, 3.3 g of a compound represented by the above formula (OMIm-PI) was obtained. Furthermore, high-purity OMIm-PI was obtained by recrystallization with butyl acetate. The 1H-NMR analysis results of the compound represented by the above formula are shown below. 1H-NMR (CD$_3$OD) δ (ppm)=7.51 (s, 1H), 7.45-7.33 (m, 6H), 4.37 (t, J=7.4 Hz, 2H), 3.97 (s, 3H), 1.91-1.86 (m, 2H), 1.35-1.27 (m, 10H), 0.88 (t, J=6.8 Hz, 3H)

Example 1

The MEKO-blocked HDI biuret obtained in Production Example B-1, a polyester polyol (P-510, produced by Kuraray Co., Ltd.), and DtBIm_PI obtained in Production Example A-2 were added such that the formulation of a thermosetting resin composition satisfied that effective NCO group (mol):hydroxyl group (mol):amidate group (mol)=1.00:0.95:0.05. Further, MIBK was added such that the amount of solvent was 1.0 times by weight relative to the blocked polyisocyanate compound. The mixture was then stirred for 30 minutes, thus preparing a thermosetting resin composition.

About 0.6 mL of the prepared thermosetting resin composition was poured onto the hot plate of the automatic curing time measuring device that had been heated to a predetermined temperature in advance, and stirring was performed. During this procedure, the curing time at each temperature from 150° C. to 80° C. was measured, taking the time between the stirring torque immediately after the start of stirring of less than 1% (0.04 mN·m) and the stirring torque exceeding 20% (0.86 mN·m) as the curing time, and the lowest temperature at which the composition was cured within 30 minutes was determined. Table 1 shows the results.

Examples 2 and 3 and Comparative Examples 1 to 3

Thermosetting resin compositions were prepared in the same manner as in Example 1, except that the blocking agent dissociation catalysts shown in Table 1 were used instead of DtBIm_PI. The curing time at each temperature was measured, and the lowest temperature at which the composition was cured within 30 minutes was determined. Table 1 shows the results.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Polyol | P-510 | P-510 | P-510 | P-510 | P-510 | P-510 |
| Blocked polyisocyanate | HDI biuret | HDI biuret | HDI biuret | HDI biuret | HDI biuret | HDI biuret |
| Isocyanate compound |  |  |  |  |  |  |
| Blocking agent | MEKO | MEKO | MEKO | MEKO | MEKO | MEKO |
| Catalyst | DtBlm_Pl | DtOlm_Pl | DtOlm_crMDI | DBTDL | OMlm_Pl | DOIm_Pl |
| Lowest temperature at which the composition was cured within 30 minutes | A | A | S | C | C | B |

Lowest temperature at which the composition was cured within 30 minutes: S: 85° C. or lower, A: 95° C. or lower, B: 100° C. or lower, C: exceeding 100° C.

The invention claimed is:

1. A blocked polyisocyanate composition comprising a blocked polyisocyanate compound and at least one amidate compound represented by the following Formula (2):

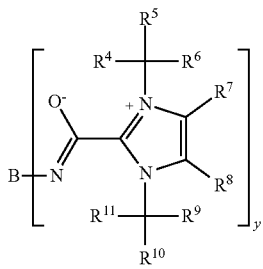

(2)

wherein B represents a substituted or unsubstituted hydrocarbon group;

$R^4$, $R^5$, $R^6$, $R^9$, $R^{10}$, and $R^{11}$ are the same or different, and each represents a $C_1$-$C_{20}$ hydrocarbon group that is optionally substituted with a heteroatom;

$R^7$ and $R^8$ are the same or different, and each represents a hydrogen atom or a $C_1$-$C_{20}$ hydrocarbon group that is optionally substituted with a heteroatom;

$R^4$ and $R^5$, $R^5$ and $R^6$, $R^7$ and $R^8$, $R^9$ and $R^{10}$, or $R^{10}$ and $R^{11}$ optionally form a ring structure together with the carbon atoms to which they are bonded;

y is an integer of 1 or more and 20 or less; and the group represented by $CR^4R^5R^6$ or the group represented by $CR^9R^{10}R^{11}$ is optionally an adamantyl group.

2. The blocked polyisocyanate composition according to claim 1, wherein B is a substituted or unsubstituted aromatic hydrocarbon group.

3. The blocked polyisocyanate composition according to claim 1, wherein $R^4$, $R^5$, $R^9$, and $R^{10}$ are the same or different, and each represents a $C_1$-$C_6$ hydrocarbon group that is optionally substituted with a heteroatom.

4. The blocked polyisocyanate composition according to claim 1, wherein $R^6$ and $R^{11}$ are the same or different, and each represents a $C_1$-$C_{12}$ hydrocarbon group that is optionally substituted with a heteroatom.

5. The blocked polyisocyanate composition according to claim 1, wherein $R^7$ and $R^8$ are hydrogen atoms.

6. The blocked polyisocyanate composition according to claim 1, wherein the amidate compound represented by Formula (2) is any of five compounds represented by the following formulas:

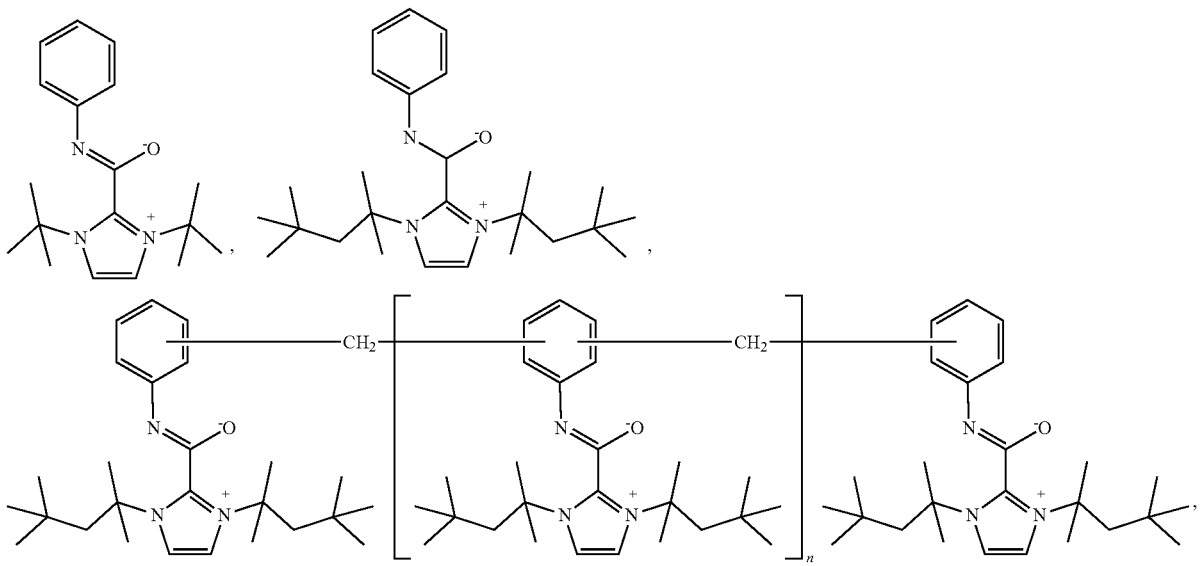

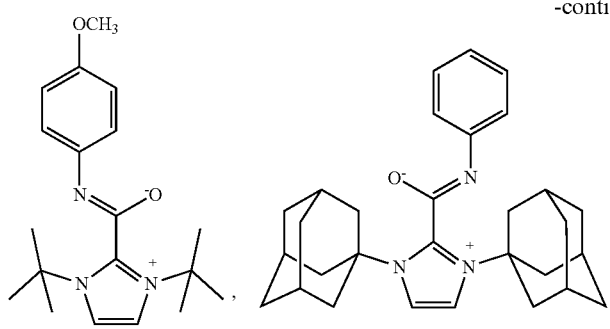

wherein n is 0 or an integer of 1 to 4.

7. The blocked polyisocyanate composition according to claim 1, wherein the blocked polyisocyanate compound is a reaction product of a blocking agent and a polyisocyanate, and the blocking agent is an oxime-based blocking agent.

8. The blocked polyisocyanate composition according to claim 1, wherein the blocked polyisocyanate compound is a reaction product of a blocking agent and a polyisocyanate, and the blocking agent is methyl ethyl ketone oxime.

9. A thermosetting resin composition comprising the blocked polyisocyanate composition according to claim 1 and a compound having an isocyanate-reactive group.

10. The thermosetting resin composition according to claim 9, wherein the compound having an isocyanate-reactive group is a polyol compound.

11. A cured product obtained by curing the thermosetting resin composition according to claim 9.

12. A method for producing a cured product, comprising curing the thermosetting resin composition according to claim 9 by heating.

* * * * *